(12) United States Patent
Ohta

(10) Patent No.: US 8,913,010 B2
(45) Date of Patent: Dec. 16, 2014

(54) POINTING SYSTEM, INFORMATION PROCESSING SYSTEM, METHOD FOR SETTING COORDINATE SYSTEM, ETC., INFORMATION PROCESSING DEVICE, AND STORAGE MEDIUM STORING INFORMATION PROCESSING PROGRAM

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 418 days.

(21) Appl. No.: 13/405,633

(22) Filed: Feb. 27, 2012

(65) Prior Publication Data

US 2013/0027298 A1 Jan. 31, 2013

(30) Foreign Application Priority Data

Jul. 27, 2011 (JP) .................................. 2011-164209

(51) Int. Cl.
*G06F 3/033* (2013.01)
*G06F 3/0346* (2013.01)
*H04N 5/44* (2011.01)

(52) U.S. Cl.
CPC ...... *G06F 3/0346* (2013.01); *H04N 2005/4428* (2013.01)
USPC ............ 345/158; 345/156; 702/150; 702/141

(58) Field of Classification Search
CPC .............. A63F 2300/105; A63F 13/06; A63F 2300/1031; G06F 3/0346
USPC ........ 345/158, 156; 702/150, 141; 273/148 B
See application file for complete search history.

(56) References Cited

U.S. PATENT DOCUMENTS

| 2007/0265088 A1* | 11/2007 | Nakada et al. ................... 463/37 |
| 2008/0132334 A1* | 6/2008 | Nonaka et al. .................. 463/37 |
| 2009/0326850 A1 | 12/2009 | Ohta |

FOREIGN PATENT DOCUMENTS

JP 2010-207329 9/2010

* cited by examiner

*Primary Examiner* — Abbas Abdulselam
*Assistant Examiner* — Shawna Stepp Jones
(74) *Attorney, Agent, or Firm* — Nixon & Vanderhye, P.C.

(57) ABSTRACT

An example pointing system includes an attitude calculation unit, a coordinate system setting unit, and a coordinate calculation unit. The attitude calculation unit calculates an attitude of a controller device in a predetermined space. The coordinate system setting unit sets a predetermined coordinate system in the predetermined space. The coordinate calculation unit calculates pointing coordinates in the coordinate system based on a relationship of the attitude with respect to the coordinate system. The coordinate system setting unit can set a direction of a predetermined axis of the coordinate system with respect to a vertical direction in the predetermined space, and can set the direction of the predetermined axis of the coordinate system with respect to a direction of the controller device in the predetermined space.

28 Claims, 15 Drawing Sheets

POINTING SYSTEM, INFORMATION PROCESSING SYSTEM, METHOD FOR SETTING COORDINATE SYSTEM, ETC., INFORMATION PROCESSING DEVICE, AND STORAGE MEDIUM STORING INFORMATION PROCESSING PROGRAM

CROSS REFERENCE TO RELATED APPLICATION

The disclosure of Japanese Patent Application No. 2011-164209 filed on Jul. 27, 2011, is incorporated herein by reference.

FIELD

The present specification discloses an information processing system, etc., in which a user can perform operations by moving a controller device.

BACKGROUND AND SUMMARY

There are conventional techniques where a user is allowed to perform an operation (pointing operation) of specifying a position in a space or on a surface by moving a controller device. For example, with conventional coordinate calculation devices, it is possible to calculate coordinates in accordance with the attitude of the controller device as coordinates (pointing coordinates) representing a position that is pointed with the controller device. This coordinate calculation device arranges a surface (a two-dimensional coordinate system) in a predetermined space, and calculates, as the pointing coordinates, coordinates of the intersection between this surface and a line segment extended from a predetermined position in a direction in accordance with the attitude of the controller device. Then, two-dimensional pointing coordinates can be calculated based on the attitude of the controller device, and the user can perform the pointing operation by changing the attitude of the controller device.

With the coordinate calculation device described above, the user can arrange a two-dimensional coordinate system used for calculating the pointing coordinates at any position. That is, in response to a user performing a predetermined setting operation, a two-dimensional coordinate system is set in a direction (the specified direction) that is specified by the controller device at the point in time of the setting operation. Then, as a two-dimensional coordinate system is arranged at a position in front of the controller device in the specified direction specified by the controller device, a player can place two-dimensional coordinates at any position, and can therefore perform the pointing operation by pointing the controller device in an intended direction.

Here, where a predetermined object (e.g., a two-dimensional coordinate system) is set in the specified direction of the controller device, if the object is always set in a predetermined direction, the object may not be set in an appropriate direction.

Therefore, the present specification discloses an information processing system, etc., in which a predetermined object (a two-dimensional coordinate system, etc.) is set in an appropriate direction in accordance with a specified direction of the controller device. The present specification also discloses an information processing system capable of improving the controllability of a pointing operation by appropriately setting a direction of a two-dimensional coordinate system used for calculating pointing coordinates.

(1)

An example pointing system described in the present specification is a pointing system for performing a pointing operation based on an attitude of a controller device. The pointing system includes an attitude calculation unit, a coordinate system setting unit, and a coordinate calculation unit. The attitude calculation unit calculates the attitude of the controller device in a predetermined space. The coordinate system setting unit sets a predetermined coordinate system in the predetermined space. The coordinate calculation unit calculates pointing coordinates in the coordinate system based on a relationship of the attitude with respect to the coordinate system. The coordinate system setting unit can set a direction of a predetermined axis of the coordinate system with respect to a vertical direction in the predetermined space, and can set the direction of the predetermined axis of the coordinate system with respect to a direction of the controller device in the predetermined space.

The "controller device" includes any device that can be held and moved by a user, in addition to the controller or the terminal device of the embodiment to be described below.

The "pointing operation" means an operation of specifying a position in a space or on a surface. That is, to "perform a pointing operation based on an attitude of a controller device" is to specify a position in a space or on a surface by controlling the attitude of the controller device.

The "pointing system" may include a controller device and an information processing device (game device) as in the embodiment to be described below, may include one or more information processing device separate from the controller device, or may include an information processing device that is integral with the controller device.

To "calculate based on a relationship of the attitude with respect to the coordinate system" is a concept including to calculate based on the attitude with respect to the coordinate system (the attitude as viewed from the origin of the coordinate system). The "coordinate calculation unit" calculates pointing coordinates in accordance with the attitude.

To "set a direction of a predetermined axis of the coordinate system with respect to a vertical direction in the predetermined space" is a concept including to set a predetermined axis with a certain inclination (direction) with respect to the vertical direction. For example, the coordinate system setting unit may set the predetermined axis so that the predetermined axis coincides with the vertical direction. To "set the direction of the predetermined axis of the coordinate system with respect to a direction of the controller device in the predetermined space" is a concept including to set a predetermined axis with a certain inclination (direction) with respect to the controller device.

The "coordinate system setting unit" only needs to be able to set the direction of the predetermined axis with respect to the vertical direction in the predetermined space or the direction of the controller device. The "coordinate system setting unit" may set the direction of the predetermined axis using two different references at the same time, or may set the direction of the predetermined axis using one of the references.

With the configuration (1) above, the pointing system can set the direction of the coordinate axis with respect to two different directions, i.e., the vertical direction in the predetermined space and the direction of the controller device. In order to set a coordinate system that is easy to operate for the user with no awkwardness, there are cases where the direction of the coordinate axis is preferably set with respect to a direction in the predetermined space and cases where the direction of the coordinate axis is preferably set with respect to the direction of the controller device, depending on the attitude of the controller device (the specified direction to be described below). With the configuration (1) above, it is possible to set a coordinate system in an appropriate direction by setting the direction of the coordinate axis selectively using one of the two different references depending on the circumstances. It is possible to improve the controllability of the pointing operation by appropriately setting the direction of the coordinate system for calculating the pointing coordinates.

(2)

The coordinate calculation unit may calculate the pointing coordinates based on a specified direction determined by the attitude of the controller device. Then, the coordinate system setting unit sets the direction of the predetermined axis of the coordinate system with respect to the vertical direction when the specified direction is closer to a horizontal direction than a predetermined reference, and sets the direction of the predetermined axis with respect to a predetermined direction of the controller device when the specified direction is closer to a vertical direction than the predetermined reference.

The "specified direction" may be a direction that is determined based on the attitude of the controller device, in addition to the direction to be described in the configuration (4) or (5) below.

With the configuration (2) above, the direction of the coordinate axis of the coordinate system can be set using different references between when the specified direction specified by the controller device is closer to the horizontal direction in the predetermined space and when the specified direction is closer to the vertical direction in the predetermined space. When the specified direction is closer to the horizontal direction, a good controllability can be achieved by setting the coordinate axis with respect to the vertical direction in the predetermined space so that the vertical direction coincides with the upward direction of the coordinate system. When the specified direction is closer to the vertical direction, a good controllability can be achieved by setting the coordinate axis with respect to the direction of the controller device so that the upward direction of the controller device coincides with the upward direction of the coordinate system. Thus, an appropriate direction of the coordinate axis when the specified direction is closer to the horizontal direction is different from that when the specified direction is closer to the vertical direction. With the configuration (2) above, since the coordinate axis is set using different references between when the specified direction is closer to the horizontal direction and when the specified direction is closer to the vertical direction, the coordinate system can be set in an appropriate direction in either case.

(3)

The coordinate calculation unit may calculate pointing coordinates representing a position specified by the specified direction on a surface defined by the coordinate system. The surface may be a flat surface or a curved surface such as a spherical surface.

With the configuration (3) above, pointing coordinates are calculated, which represent a position on a straight line extended from the controller device in the specified direction or a vicinity thereof. Then, since the user can change the pointing position by changing the specified direction of the controller device, it is possible to easily perform the pointing operation using the controller device.

(4)

The controller device may have an elongated shape. Then, the specified direction is determined as a longitudinal direction of the controller device.

With the configuration (4) above, the specified direction is the longitudinal direction of the controller device having an elongated shape. Therefore, the user can easily change the specified direction when the controller device is held in one hand, and it is possible to easily perform the pointing operation.

(5)

The controller device may have a plate-like shape. Then, the specified direction is determined as a direction perpendicular to a surface of the plate-like shape of the controller device.

With the configuration (5) above, the specified direction is the direction perpendicular to the surface of the controller device having a plate-like shape. Therefore, the user can easily change the specified direction when the controller device is held (e.g., by both hands) so that the surface of the controller device faces the user, and it is possible to easily perform the pointing operation.

(6)

The coordinate system setting unit may set the coordinate system so that the predetermined axis of the coordinate system is closer to the vertical direction as the specified direction is closer to a horizontal direction, and so that the predetermined axis is closer to a predetermined direction of the controller device as the specified direction is closer to the vertical direction.

With the configuration (6) above, the coordinate system is primarily set with respect to the vertical direction of the predetermined space when the specified direction is closer to the horizontal direction, and the coordinate system is primarily set with respect to a predetermined direction of the controller device when the specified direction is closer to the vertical direction. Thus, the coordinate system can be set in an appropriate direction, irrespective of the specified direction. With the configuration (6) above, the direction of the coordinate system is set taking into consideration both of the two different references when the specified direction is about in the middle between the horizontal direction and the vertical direction. Thus, since the direction of the coordinate system is not set in an ill-balanced manner with respect to one of the vertical direction of the predetermined space and the predetermined direction of the controller device, the direction of the coordinate system is prevented from becoming significantly off the direction assumed by the user. As a result, it is possible to avoid making the user feel awkward about the direction of the coordinate system.

(7)

The coordinate system setting unit may be capable of setting the coordinate system so that a downward direction in the coordinate system extends in a direction of gravity in the predetermined space, and may be capable of setting the coordinate system so that the downward direction in the coordinate system extends in a downward direction of the controller device.

The "downward direction in the coordinate system" does not have to be a direction that is uniquely determined for the coordinate system. For example, the "downward direction in the coordinate system" may be set appropriately in accordance with the contents of the information processes performed by using the pointing coordinates, or may be set so as to correspond to the direction specified by the user through a pointing operation.

The "downward direction of the controller device" does not have to be a direction that is uniquely determined for the controller device. For example, the "downward direction of the controller device" may be determined from the shape of the controller device, or the "downward direction of the controller device" may be appropriately determined in accordance with the purpose of the controller device or the pointing operation, or the contents of the information processes performed by using the pointing coordinates.

With the configuration (7) above, the pointing system can set the coordinate system so that the downward direction in the coordinate system extends in the direction of gravity in the predetermined space, and can set the planar coordinate system so that the downward direction in the coordinate system extends in the downward direction of the controller device. Therefore, it is possible to appropriately set the direction of the coordinate system both when the direction of the coordinate system is preferably set with respect to the direction of gravity in the predetermined space (e.g., when the specified direction is closer to the horizontal direction) and when the direction of the coordinate system is preferably set with respect to the downward direction of the controller device (e.g., when the specified direction is closer to the vertical direction).

(8)

The controller device may include a sensor unit including a gyrosensor and/or an acceleration sensor. Then, the attitude calculation unit calculates the attitude of the controller device based on a detection result of the sensor unit.

With the configuration (8) above, the pointing system can easily calculate the attitude of the controller device using the detection result of a gyrosensor and/or an acceleration sensor.

(9)

An example information processing system described in the present specification sets a predetermined setting object in a virtual space based on an attitude of a controller device. The information processing system includes an attitude calculation unit, and a setting unit. The attitude calculation unit calculates the attitude of the controller device in the virtual space. The setting unit sets a direction of the setting object with respect to a vertical direction in the virtual space when a specified direction, which is determined by the attitude of the controller device, is closer to a horizontal direction in the virtual space than a predetermined reference, and sets the direction of the setting object with respect to a predetermined direction of the controller device when the specified direction is closer to the vertical direction than the predetermined reference.

With the configuration (9) above, the direction of the setting object can be set using different references between when the specified direction specified by the controller device is closer to the horizontal direction in the predetermined space and when the specified direction is closer to the vertical direction in the predetermined space. When the specified direction is closer to the horizontal direction, the setting object is preferably set with respect to the vertical direction in the predetermined space so that the vertical direction coincides with the upward direction of the setting object. When the specified direction is closer to the vertical direction, the setting object is preferably set with respect to the direction of the controller device so that the upward direction of the controller device coincides with the upward direction of the setting object. Thus, the appropriate direction of the setting object when the specified direction is closer to the horizontal direction is different from that when the specified direction is closer to the vertical direction. With the configuration (9) above, since the setting object is set using different references between when the specified direction is closer to the horizontal direction and when the specified direction is closer to the vertical direction, the setting object can be set in an appropriate direction in either case.

The present specification also discloses an example information processing device including the various units set forth in (1) to (9) above. The present specification also discloses an example non-transitory computer-readable storage medium storing an information processing program for causing a computer to function as units that are equivalent to the various units set forth in (1) to (9) above. The present specification also discloses a setting method to be carried out by the pointing system, the information processing system or the information processing device.

With the pointing system, the information processing system, the method for setting coordinate system, etc., the information processing device, and the storage medium storing an information processing program set forth above, the direction of a setting object, such as a coordinate system, is set using two different references, i.e., the direction in the predetermined space and the direction in the controller device, the setting object can be set in an appropriate direction. Where the setting object is a coordinate system for calculating pointing coordinates, the controllability of the pointing operation can be improved by appropriately setting the direction of the coordinate system.

These and other objects, features, aspects and advantages will become more apparent from the following detailed description when taken in conjunction with the accompanying drawings.

DETAILED DESCRIPTION OF NON-LIMITING EXAMPLE EMBODIMENTS

[1. General Configuration of Game System]

Figure 1:
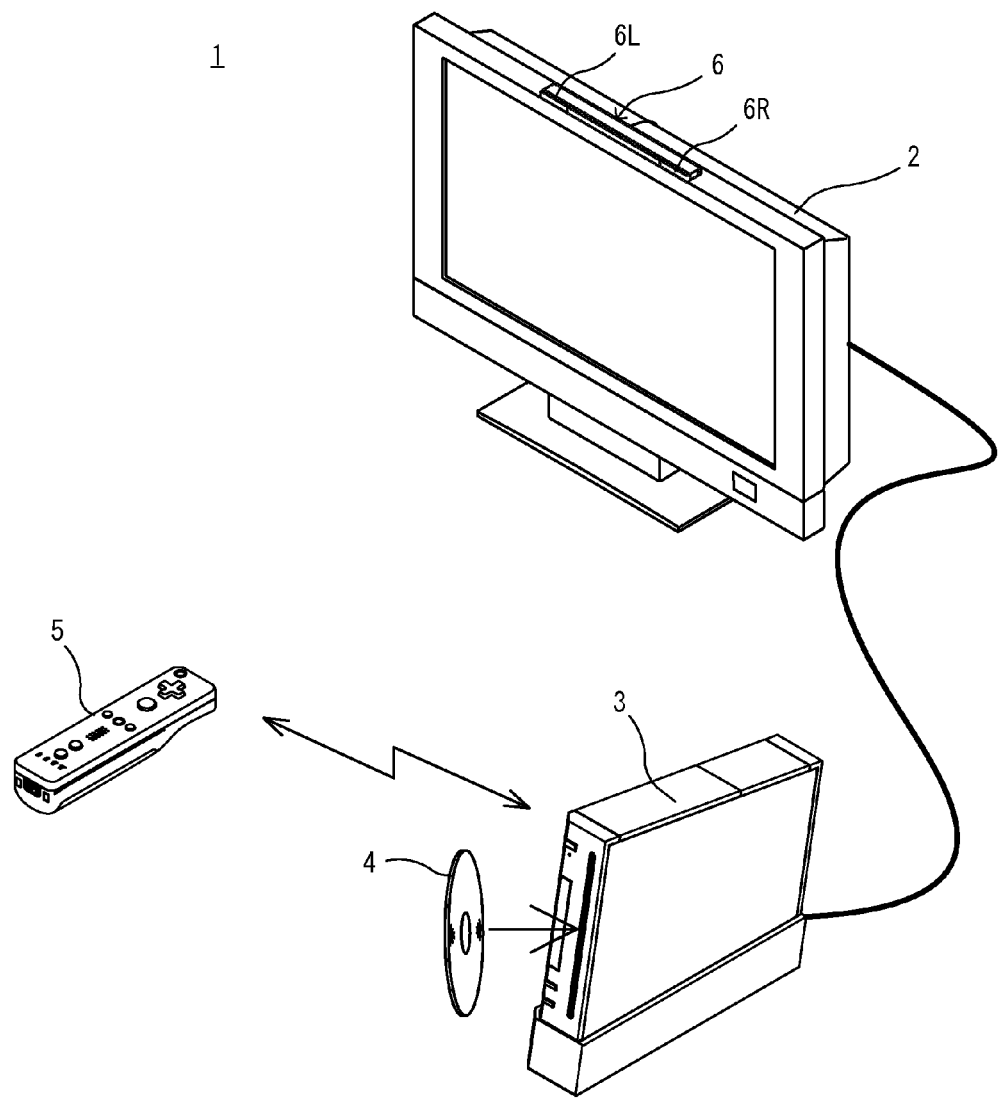
FIG. 1 is an external view showing an example non-limiting game system.

An example game system of the present embodiment will be described with reference to FIG. 1. FIG. 1 is an external view of the game system. In the following description, a home-console type game device is taken as an example for describing a game device and a game program of the present embodiment. In FIG. 1, a game system 1 includes a television receiver (hereinafter, simply referred to as a "television") 2, a game device 3, an optical disc 4, a controller 5, and a marker device 6. In this system, the game device 3 performs game processes based on game operations performed with the controller 5.

The game system 1 is an example pointing system for performing a pointing operation based on the attitude of the controller device (the controller 5). While the present embodiment is directed to, as an example, the game system 1 having a configuration including the various units shown in FIG. 1, the game system 1 may be any game system as long as it is capable of calculating the attitude of the controller device and calculating the pointing coordinates representing the pointing position (the position specified by the pointing operation) based on the attitude. For example, the game system 1 may have a configuration including only the game device 3 and the controller 5. In other embodiments, the information processes of the present embodiment may be performed by a portable information processing device that is capable of performing the attitude calculation process and the pointing coordinates calculation process.

In the game device 3, the optical disc 4 typifying an information storage medium used for the game device 3 in a replaceable manner is removably inserted. An information processing program (a game program, for example) to be executed by the game device 3 is stored in the optical disc 4. The game device 3 has, on the front surface thereof, an insertion opening for the optical disc 4. The game device 3 reads and executes the information processing program stored on the optical disc 4 which is inserted into the insertion opening, to perform the game process.

The television 2, which is an example display device, is connected to the game device 3 by a connecting cord. Game images obtained as a result of the game processes performed by the game device 3 are displayed on the television 2. The television 2 includes a speaker 2a (see FIG. 2), and a speaker 2a outputs game sounds obtained as a result of the game process. In alternative embodiments, the game device 3 and the non-portable display device may be an integral unit. Also, the communication between the game device 3 and the television 2 may be wireless communication.

The marker device 6 is provided along the periphery of the screen (on the upper side of the screen in FIG. 1) of the television 2. The user (player) can perform game operations by moving the controller 5, the details of which will be described later, and a marker device 6 is used by the game device 3 for calculating the position, the roll angle, etc., of the controller 5. The marker device 6 includes two markers 6R and 6L on opposite ends thereof. Specifically, a marker 6R (as well as the marker 6L) includes one or more infrared LEDs (Light Emitting Diodes), and emits an infrared light in a forward direction of the television 2. The marker device 6 is connected to the game device 3 in a wired connection (or a wireless connection), and the game device 3 is able to control the lighting of each infrared LED of the marker device 6. The marker device 6 is portable, and the user can arrange the marker device 6 at any position. While FIG. 1 shows an embodiment in which the marker device 6 is arranged on top of the television 2, the position and the direction of arranging the marker device 6 are not limited to this particular arrangement.

The controller 5 provides the game device 3 with operation data representing the content of operations performed on the controller itself. The controller 5 and the game device 3 can communicate with each other by wireless communication. In the present embodiment, the wireless communication between a controller 5 and the game device 3 uses, for example, Bluetooth (Registered Trademark) technology. In other embodiments, the controller 5 and the game device 3 may be connected by a wired connection. While only one controller 5 is included in the game system 1 in FIG. 1, the game system 1 may include a plurality of controllers 5. That is, the game device 3 can communicate with a plurality of controllers, and a game can be played by multiple players by using a predetermined number of controllers at the same time. The detailed configuration of the controller 5 will be described below.

[2. Internal Configuration of Game Device 3]

Figure 2:
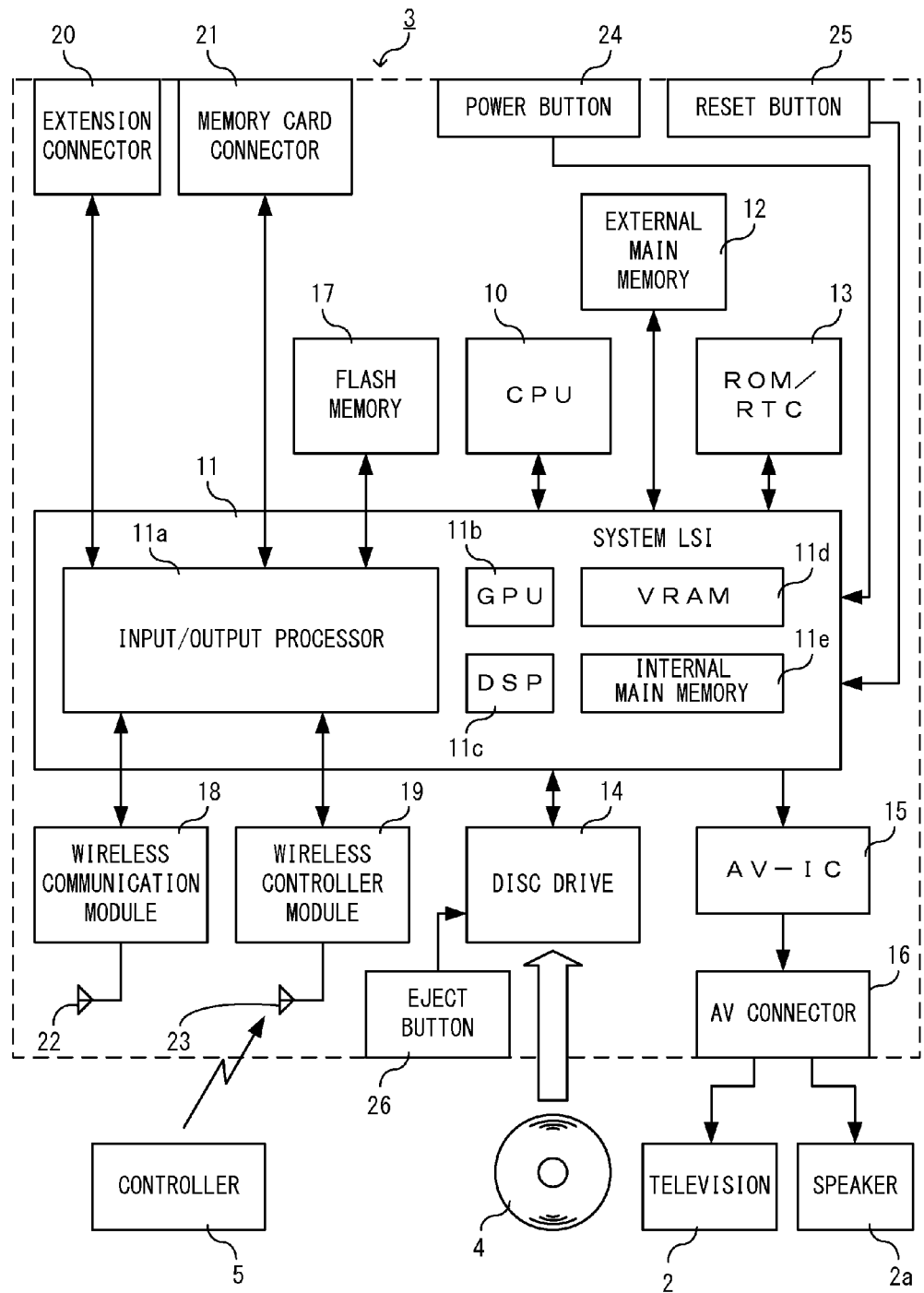
FIG. 2 is a functional block diagram showing an example non-limiting game device.

An internal configuration of the game device 3 will be described with reference to FIG. 2. FIG. 2 is a block diagram showing a configuration of the game device 3. The game device 3 includes a CPU 10, a system LSI 11, an external main memory 12, a ROM/RTC 13, a disc drive 14, an AV-IC 15, etc.

The CPU 10 performs game processes by executing a game program stored, for example, on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transmission between the respective components connected thereto, generating images to be displayed, acquiring data from an external device(s), and the like. The internal configuration of the system LSI 11 will be described below. The external main memory 12 is of a volatile type and stores a program such as a game program read from the optical disc 4, a game program read from a flash memory 17, and various data. The external main memory 12 is used as a work area and a buffer area for the CPU 10. The ROM/RTC 13 includes a ROM (a so-called boot ROM) incorporating a boot program for the game device 3, and a clock circuit (RTC: Real Time Clock) for counting time. The disc drive 14 reads program data, texture data, and the like from the optical disc 4, and writes the read data into an internal main memory 11e to be described below or the external main memory 12.

The system LSI 11 includes an input/output processor (I/O processor) 11a, a GPU (Graphics Processor Unit) 11b, a DSP (Digital Signal Processor) 11c, a VRAM 11d, and the internal main memory 11e. Although not shown in the figures, these components 11a to 11e are connected with each other through an internal bus.

The GPU 11b, acting as a part of a rendering unit, generates images in accordance with graphics commands (rendering commands) from the CPU 10. The VRAM 11d stores data (data such as polygon data and texture data) used for the GPU 11b to execute the graphics commands. When images are generated, the GPU 11b generates image data using data stored in the VRAM 11d.

The DSP 11c, functioning as an audio processor, generates sound data using sound data and sound waveform (tone quality) data stored in one or both of the internal main memory 11e and the external main memory 12.

The image data and the sound data generated as described above are read out by the AV-IC 15. The AV-IC 15 outputs the read-out image data to the television 2 via an AV connector 16, and outputs the read-out sound data to the speaker 2a provided in the television 2. Thus, images are displayed on the television 2, and sounds are outputted from the speaker 2a.

The input/output processor 11a exchanges data with components connected thereto, and downloads data from an external device(s). The input/output processor 11a is connected to the flash memory 17, a wireless communication module 18, a wireless controller module 19, an extension connector 20, and a memory card connector 21. An antenna 22 is connected to the wireless communication module 18, and an antenna 23 is connected to the wireless controller module 19.

The game device 3 can be connected to a network such as the Internet to communicate with external information processing devices (e.g., other game devices, various servers, etc.). That is, the input/output processor 11a can be connected to a network via the wireless communication module 18 and the antenna 22 to communicate with other game devices and various servers connected to the network. The input/output processor 11a regularly accesses the flash memory 17, and detects the presence or absence of any data to be transmitted to the network, and when detected, transmits the data to the network via the wireless communication module 18 and the antenna 22. The input/output processor 11a receives data transmitted from other game devices and data downloaded from a download server via the network, the antenna 22 and the wireless communication module 18, and stores the received data in the flash memory 17. The CPU 10 executes a game program so as to read data stored in the flash memory 17 and use the data in the game program. The flash memory 17 may store game save data (game result data or unfinished game data) of a game played using the game device 3 in addition to data exchanged between the game device 3 other game devices or various servers.

The game device 3 can receive operation data from the controller 5. That is, the input/output processor 11a receives operation data transmitted from the controller 5 via the antenna and the wireless communication module 19, and stores (temporarily) it in a buffer area of the internal main memory 11e or the external main memory 12.

The game device 3 can be connected to other devices and external storage media. That is, the extension connector 20 and the memory card connector 21 are connected to the input/output processor 11a. The extension connector 20 is a connector for an interface, such as a USB or SCSI interface, and the extension connector 20 can receive a medium such as an external storage medium, a peripheral device such as another controller, or a wired communication connector which enables communication with a network in place of the wireless communication module 18. The memory card connector 21 is a connector for connecting thereto an external storage medium such as a memory card. For example, the input/output processor 11a can access an external storage medium via the extension connector 20 or the memory card connector 21 to store data in the external storage medium or read out data from the external storage medium.

The game device 3 includes a power button 24, a reset button 25, and an eject button 26. The power button 24 and the reset button 25 are connected to the system LSI 11. When the power button 24 is turned on, power is supplied to the components of the game device 3 from an external power supply through an AC adaptor (not shown). When the reset button 25 is pressed, the system LSI 11 reboots a boot program of the game device 3. The eject button 26 is connected to the disc drive 14. When the eject button 26 is pressed, the optical disc 4 is ejected from the disc drive 14.

[3. Configuration of Controller 5]

Figure 3:
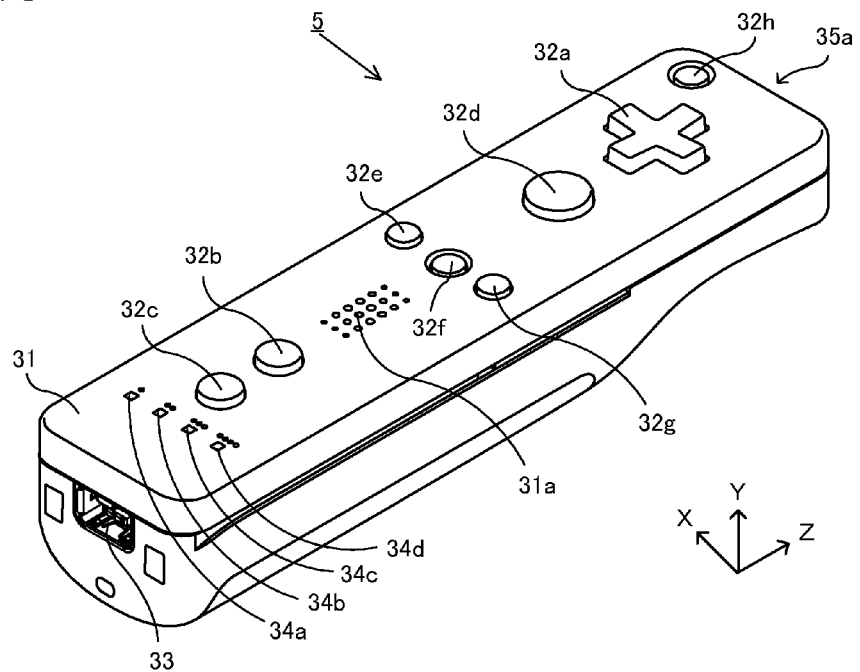
FIG. 3 is a perspective view showing an example non-limiting controller as viewed from the top rear side thereof.
Figure 4:
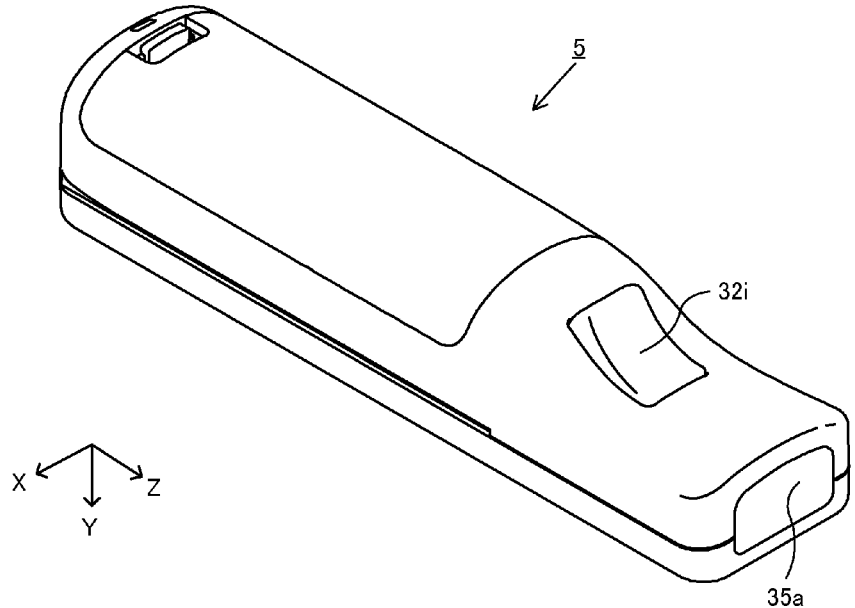
FIG. 4 is a perspective view showing the example controller as viewed from the bottom front side thereof.

Next, with reference to FIGS. 3 to 7, the controller 5 will be described. FIG. 3 is one perspective view illustrating an external configuration of the controller 5. FIG. 4 is another perspective view illustrating an external configuration of the controller 5. The perspective view of FIG. 3 shows the controller 5 as viewed from the top rear side thereof, and the perspective view of FIG. 4 shows the controller 5 as viewed from the bottom front side thereof.

As shown in FIGS. 3 and 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or a child. A user can perform game operations by pressing buttons provided on the controller 5, and by moving the controller 5 itself to change the position and the orientation (tilt) thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present specification, the top surface of the housing 31 on which the buttons 32a to 32h are provided may be referred to as a "button surface". As shown in FIG. 4, a recessed portion is formed on the bottom surface of the housing 31, and a B button 32i is provided on a rear slope surface of the recessed portion. The operation buttons 32a to 32i are assigned, as necessary, their respective functions in accordance with the game program executed by the game device 3. Further, the power button 32h is used to remotely turn ON/OFF the game device 3. The home button 32f and the power button 32h each have the top surface thereof recessed below the top surface of the housing 31. Therefore, the likelihood of the home button 32f and the power button 32h being inadvertently pressed by the user is reduced.

On the rear surface of the housing 31, the connector 33 is provided. The connector 33 is used for connecting another device (e.g., another sensor unit or another controller) to the controller 5. Both sides of the connector 33 on the rear surface of the housing 31 have a engagement hole 33a (see FIG. 6) for preventing easy inadvertent disengagement of a device connected to the controller 5 as described above.

In the rear-side portion of the top surface of the housing 31, a plurality (four in FIG. 3) of LEDs 34a to 34d are provided. The controller 5 is assigned a controller type (number) so as to be distinguishable from other controllers. The LEDs 34a to 34d are each used for informing the user of the controller type which is currently set for the controller 5, and for informing the user of the battery level of the controller 5, for example. Specifically, when game operations are performed using the controller 5, one of the plurality of LEDs 34a to 34d corresponding to the controller type is lit up.

The controller 5 has an image capturing/processing section 35 (FIG. 6), and a light incident surface 35a of an image capturing/processing section 35 is provided on the front surface of the housing 31, as shown in FIG. 4. The light incident surface 35a is made of a material transmitting therethrough at least infrared light from the markers 6R and 6L.

On the top surface of the housing 31, sound holes 31a for externally outputting a sound from a speaker 49 (see FIG. 5) provided in the controller 5 are provided between the first button 32b and the home button 32f.

Figure 5:
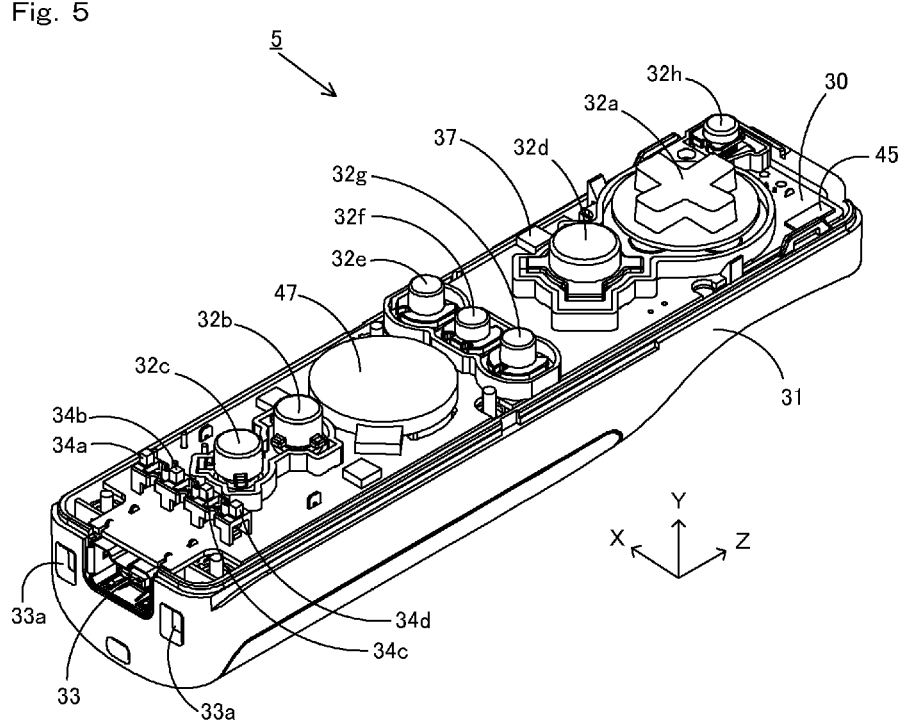
FIG. 5 is a diagram showing an example internal configuration of the controller.
Figure 6:
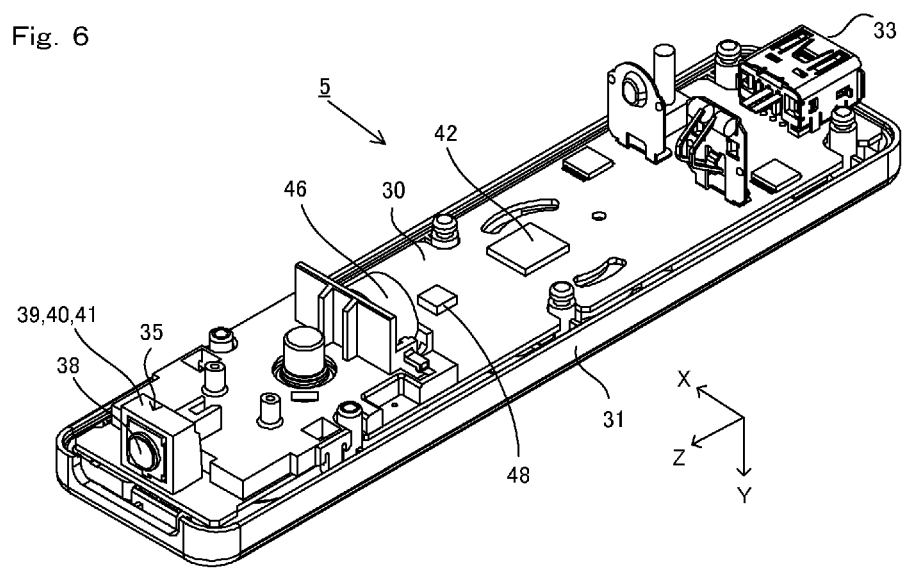
FIG. 6 is a diagram showing an example internal configuration of the controller.

Next, with reference to FIGS. 5 and 6, an internal structure of the controller 5 will be described. FIGS. 5 and 6 are diagrams illustrating the internal structure of the controller 5. FIG. 5 is a perspective view illustrating a state in which an upper casing (a part of the housing 31) of the controller 5 is removed. FIG. 6 is a perspective view illustrating a state in which a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a to 34d, an acceleration sensor 37, an antenna 45, the speaker 49, and the like are provided. These elements are connected to a microcomputer 42 (see FIG. 6) via lines (not shown) formed on the substrate 30 and the like. In the present embodiment, the acceleration sensor 37 is provided at a position offset from the center of the controller 5 with respect to the X-axis direction. Thus, calculation of the movement of the controller 5 being rotated about the Z-axis is facilitated. Further, the acceleration sensor 37 is provided anterior to the center of the controller 5 with respect to the longitudinal direction (Z-axis direction). Further, a wireless module 44 (see FIG. 6) and the antenna 45 allow the controller 5 to act as a wireless controller.

As shown in FIG. 6, at a front edge of a bottom main surface of the substrate 30, the image capturing/processing section 35 is provided. The image capturing/processing section 35 includes an infrared filter 38, a lens 39, an image capturing element 40 and an image processing circuit 41 located in this order from the front of the controller 5. These components 38 to 41 are attached on the bottom main surface of the substrate 30.

On the bottom main surface of the substrate 30, the microcomputer 42 and a vibrator 46 are provided. The vibrator 46 is, for example, a vibration motor or a solenoid, and is connected to the microcomputer 42 via lines formed on the substrate 30 or the like. The controller 5 is vibrated by actuation of the vibrator 46 based on a command from the microcomputer 42. Therefore, the vibration is conveyed to the user's hand holding the controller 5, and thus a so-called vibration-feedback game is realized. In the present embodiment, the vibrator 46 is disposed slightly toward the front of the housing 31. That is, the vibrator 46 is positioned offset from the center toward the end of the controller 5 so that the vibration of the vibrator 46 greatly vibrates the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

The shape of the controller 5, the shape of each operation button, the number and the positions of acceleration sensors and vibrators, and so on, shown in FIGS. 3 to 6 are merely illustrative, and the systems, methods, and techniques described herein may be implemented with controllers having other shapes, numbers, and positions. Further, although in the present embodiment the image-capturing direction of the image-capturing section is the Z-axis positive direction, the image-capturing direction may be any direction. That is, the position of the image capturing/processing section 35 (the light incident surface 35a of the image capturing/processing section 35) in the controller 5 may not be on the front surface of the housing 31, but may be on any other surface on which light can be received from the outside of the housing 31.

Figure 7:
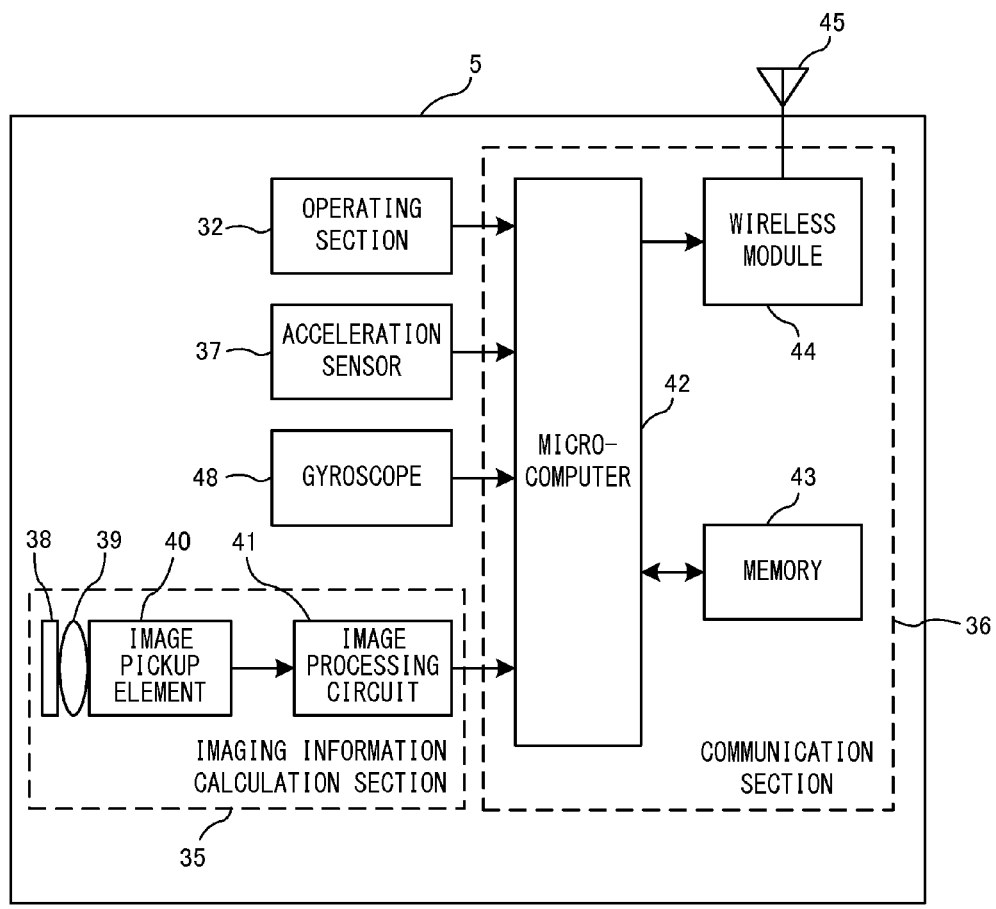
FIG. 7 is a block diagram showing an example configuration of the controller.

FIG. 7 is a block diagram illustrating a configuration of the controller 5. The controller 5 includes an operation section (the operation buttons 32a to 32i), the image capturing/processing section 35, a communication section 36, the acceleration sensor 37, and a gyrosensor 48. The controller 5 transmits to the game device 3, as operation data, data representing the content of operations performed on the controller itself.

The operation section 32 includes the operation buttons 32a to 32i described above, and outputs, to the microcomputer 42 of the communication section 36, operation button data indicating the input status of the operation buttons 32a to 32i (e.g., whether or not the operation buttons 32a to 32i are pressed).

The image capturing/processing section 35 is a system for analyzing image data captured by the image-capturing element and calculating the centroid, the size, etc., of an area (s) having a high brightness in the image data. The image capturing/processing section 35 has a maximum sampling period of, for example, about 200 frames/sec., and therefore can trace and analyze even relatively fast motion of the controller 5.

The image capturing/processing section 35 includes the infrared filter 38, the lens 39, an image capturing element 40 and the image processing circuit 41. The infrared filter 38 transmits therethrough only infrared light included in the light incident on the front surface of the controller 5. The lens 39 collects the infrared light transmitted through the infrared filter 38 so that it is incident on the image capturing element 40. The image capturing element 40 is a solid-state image-capturing device such as, for example, a CMOS sensor or a CCD sensor, which receives the infrared light collected by the lens 39, and outputs an image signal. The marker device 6 of which images are captured is formed by markers outputting infrared light. Therefore, the provision of the infrared filter 38 enables the image capturing element 40 to receive only the infrared light transmitted through the infrared filter 38 and generate image data, so that an image of the image-capturing object (the marker device 6) can be captured more accurately. Hereinafter, the image taken by the image capturing element 40 is referred to as a captured image. The image data generated by the image capturing element 40 is processed by the image processing circuit 41. The image processing circuit 41 calculates the positions of the image-capturing objects within the captured image. The image processing circuit 41 outputs coordinates of the calculated positions, to the microcomputer 42 of the communication section 36. The data representing the coordinates is transmitted as operation data to the game device 3 by the microcomputer 42. Hereinafter, the coordinates are referred to as "marker coordinates". The marker coordinates change depending on the roll orientation (roll angle about the z axis) and/or the position of the controller 5 itself, and therefore the game device 3 can calculate, for example, the roll angle and the position of the controller 5 using the marker coordinates.

In other embodiments, the controller 5 may not include the image processing circuit 41, and the captured image itself may be transmitted from the controller 5 to the game device 3. In this case, the game device 3 may have a circuit or a program, having the same function as the image processing circuit 41, for calculating the marker coordinates.

The acceleration sensor 37 detects accelerations (including gravitational acceleration) of the controller 5, that is, force (including gravity) applied to the controller 5. The acceleration sensor 37 detects a value of a portion of acceleration (linear acceleration) that is applied to the detection section of the acceleration sensor 37 in the straight line direction along the sensing axis direction, among all the acceleration applied to the detection section of the acceleration sensor 37. For example, a multi-axis acceleration sensor having two or more axes detects acceleration components along the axes, as the acceleration applied to the detection section of the acceleration sensor. While the acceleration sensor 37 is assumed to be an electrostatic capacitance type MEMS (Micro Electro Mechanical System) acceleration sensor, other types of acceleration sensors may be used.

In the present embodiment, the acceleration sensor 37 detects linear acceleration in each of three axis directions, i.e., the up/down direction (Y-axis direction shown in FIG. 3), the left/rightward direction (the X-axis direction shown in FIG. 3), and the forward/backward direction (the Z-axis direction shown in FIG. 3), relative to the controller 5. The acceleration sensor 37 detects acceleration in the straight line direction along each axis, and an output from the acceleration sensor 37 represents a value of the linear acceleration for each of the three axes. In other words, the detected acceleration is represented as a three-dimensional vector in an XYZ-coordinate system (controller coordinate system) defined relative to the controller 5.

Data (acceleration data) representing the acceleration detected by the acceleration sensor 37 is outputted to the communication section 36. The acceleration detected by the acceleration sensor 37 changes depending on the orientation and the movement of the controller 5 itself, and therefore the game device 3 is capable of calculating the orientation and the movement of the controller 5 using the obtained acceleration data. In the present embodiment, the game device 3 calculates the attitude, the roll angle, etc., of the controller 5 based on the obtained acceleration data.

One skilled in the art will readily understand from the description herein that additional information relating to the controller 5 can be estimated or calculated (determined) through a process by a computer, such as a processor (for example, the CPU 10) of the game device 3 or a processor (for example, the microcomputer 42) of the controller 5, based on an acceleration signal outputted from the acceleration sensor 37. For example, in the case in which the computer performs a process on the premise that the controller 5 including the acceleration sensor 37 is in static state (that is, in the case in which the process is performed on the premise that the acceleration to be detected by the acceleration sensor includes only the gravitational acceleration), when the controller 5 is actually in static state, it is possible to determine whether or not, or how much the controller 5 is tilting relative to the direction of gravity, based on the detected acceleration. Specifically, when the state in which the detection axis of the acceleration sensor 37 faces vertically downward is used as a reference, whether or not the controller 5 is tilting relative to the reference can be determined based on whether or not 1G (gravitational acceleration) is present, and the degree of tilt of the controller 5 relative to the reference can be determined based on the magnitude thereof. Further, with the multi-axis acceleration sensor 37, it is possible to more specifically determine the degree of tilt of the controller 5 relative to the direction of gravity by performing a process on the acceleration signals of different axes. In this case, the processor may calculate, based on the output from the acceleration sensor 37, the tilt angle of the controller 5, or the tilt direction of the controller 5 without calculating the tilt angle. Thus, by using the acceleration sensor 37 in combination with the processor, it is possible to determine the tilt angle or the attitude of the controller 5.

On the other hand, when it is premised that the controller 5 is in dynamic state (in which the controller 5 is being moved), the acceleration sensor 37 detects the acceleration based on the movement of the controller 5, in addition to the gravitational acceleration, and it is therefore possible to determine the movement direction of the controller 5 by removing the gravitational acceleration component from the detected acceleration through a predetermined process. Even when it is premised that the controller 5 is in dynamic state, it is possible to determine the tilt of the controller 5 relative to the direction of gravity by removing the acceleration component based on the movement of the acceleration sensor from the detected acceleration through a predetermined process. In other embodiments, the acceleration sensor 37 may include an embedded processor or other type of dedicated processor for performing a predetermined process on an acceleration signal detected by the built-in acceleration detector before the acceleration signal is outputted to the microcomputer 42. For example, when the acceleration sensor 37 is used to detect static acceleration (for example, gravitational acceleration), the embedded or dedicated processor may convert the acceleration signal to a tilt angle(s) (or another suitable parameter).

The gyrosensor 48 detects angular velocities about three axes (the X, Y and Z axes in the embodiment). In the present specification, with respect to the image-capturing direction (the Z-axis positive direction) of the controller 5, the rotation direction about the X axis is referred to as the pitch direction, the rotation direction about the Y axis as the yaw direction, and the rotation direction about the Z axis as the roll direction. The number and combination of gyrosensors to be used are not limited to any particular number and combination as long as a gyrosensor 48 can detect angular velocities about three axes. For example, the gyrosensor 48 may be a 3-axis gyrosensor, or angular velocities about three axes may be detected by combining together a 2-axis gyrosensor and a 1-axis gyrosensor. Data representing the angular velocity detected by the gyrosensor 48 is outputted to the communication section 36. The gyrosensor 48 may be a gyrosensor that detects an angular velocity or velocities about one axis or two axes.

The communication section 36 includes the microcomputer 42, a memory 43, the wireless module 44 and the antenna 45. The microcomputer 42 controls the wireless module 44 for wirelessly transmitting, to the game device 3, data acquired by the microcomputer 42 while using the memory 43 as a storage area in the process.

Data outputted from the operation section 32, the image capturing/processing section 35, the acceleration sensor 37 and the gyrosensor 48 to the microcomputer 42 are temporarily stored in the memory 43. The data are transmitted as the operation data (controller operation data) to the game device 3. At the time of the transmission to the wireless communication module 19 of the game device 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The wireless communication module 19 of the game device 3 receives the low power radio wave signal. The game device 3 demodulates or decodes the received low power radio wave signal to obtain the operation data. Based on the obtained operation data, the CPU 10 of the game device 3 performs the game process. Note that while the wireless transmission from the communication section 36 to the wireless communication module 19 is sequentially performed with a predetermined cycle, since the game process is generally performed with a cycle of 1/60 sec (as one frame period), the transmission may be performed with a cycle less than or equal to this period. The communication section 36 of the controller 5 outputs, to the wireless communication module 19 of the game device 3, the operation data at a rate of once per 1/200 sec, for example.

As described above, as operation data representing operations performed on the controller itself, the controller 5 can transmit marker coordinate data, acceleration data, angular velocity data, and operation button data. The game device 3 performs the game processes using the operation data as game inputs. Therefore, by using the controller 5, the user can perform game operations of moving the controller 5 itself, in addition to the conventional typical game operation of pressing the operation buttons. For example, it enables an operation of tilting the controller 5 to an intended attitude, an operation of specifying an intended position on the screen with the controller 5, an operation of moving the controller 5 itself, etc.

The controller 5 is illustrated herein as an input device including the gyrosensor 48, the acceleration sensor 37, and the image capturing element 40 as elements for calculating the movement (including the position and the attitude, or changes in the position and the attitude) of the controller 5. Note however that in other embodiments, the controller 5 may include only one or two of these elements. In other embodiments, the controller 5 may include other sensors instead of, or in addition to, these elements.

[4. Outline of Process for Calculating Pointing Coordinates]

Figure 8:
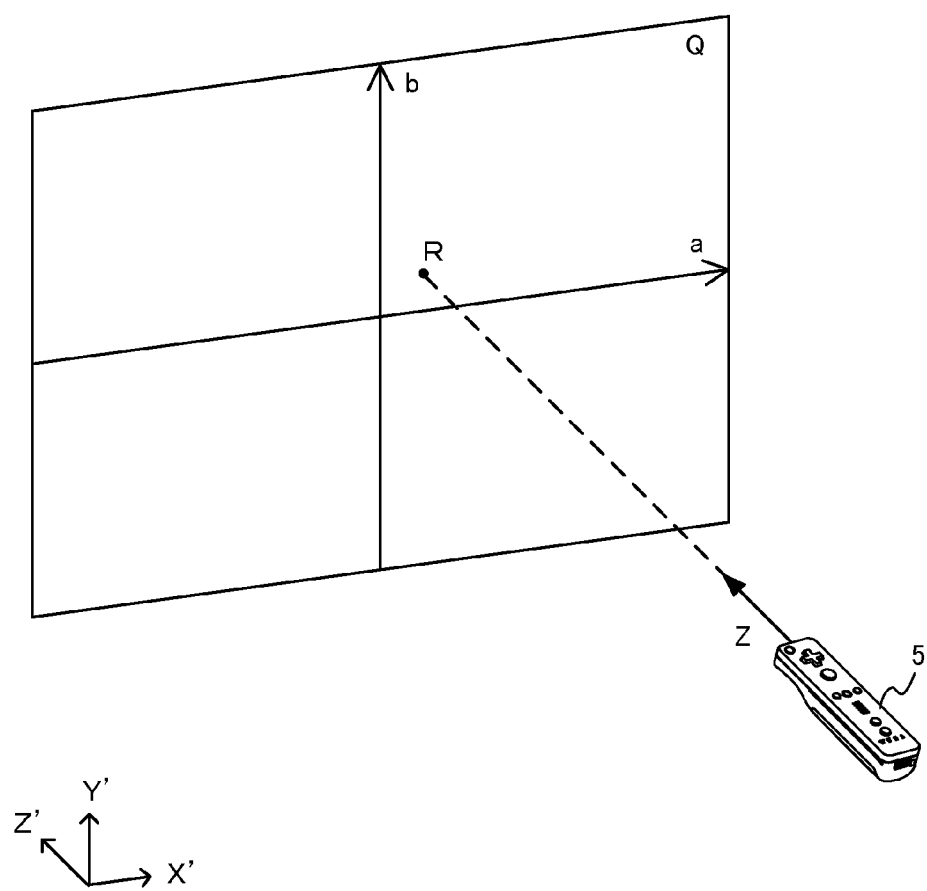
FIG. 8 is a diagram showing an example predetermined space, which is set for calculating pointing coordinates.
Figure 9:
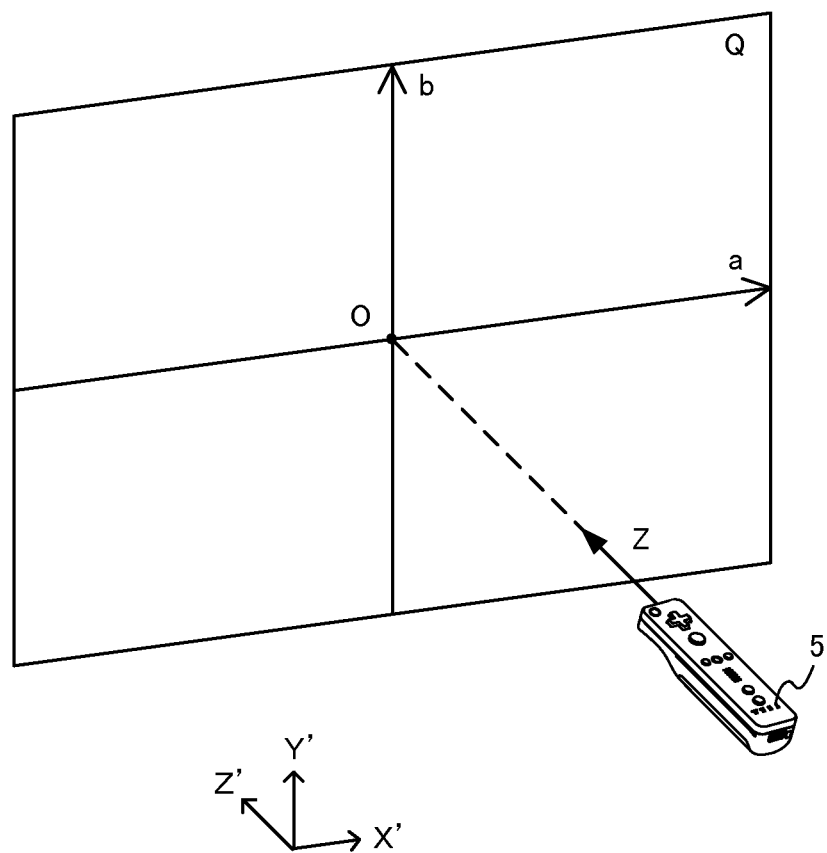
FIG. 9 is a diagram showing the controller and an example coordinate surface Q when setting the coordinate surface Q.
Figure 10:
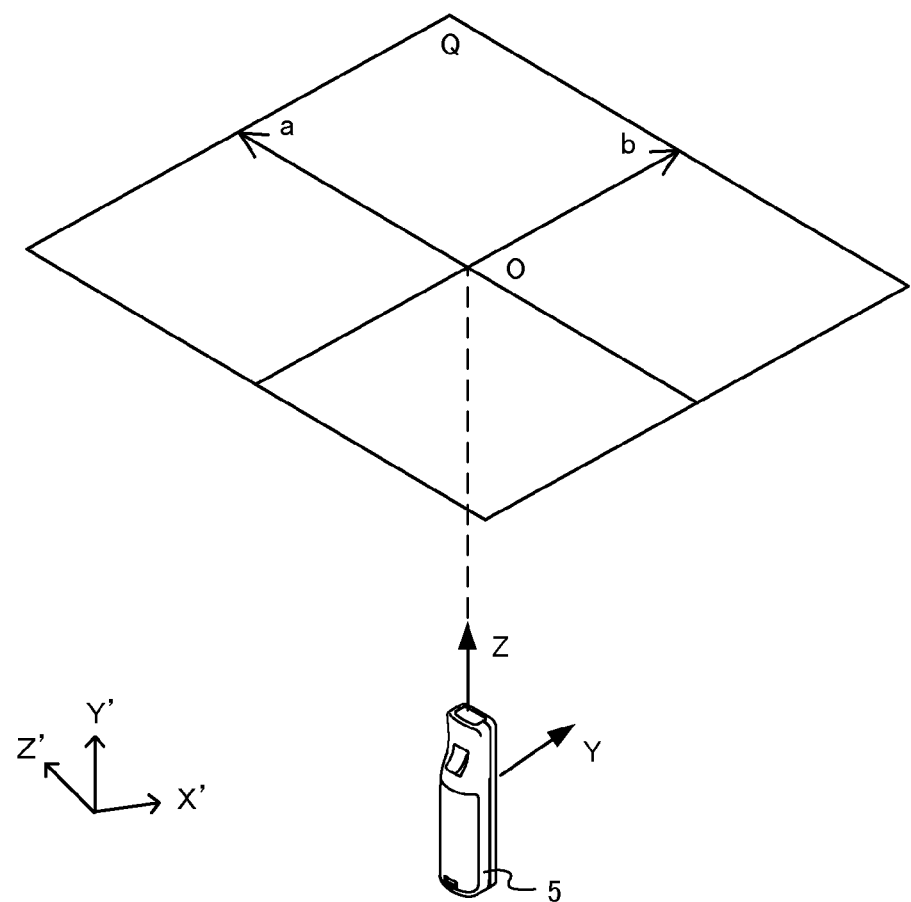
FIG. 10 is a diagram showing the controller and an example coordinate surface Q when setting the coordinate surface Q where the specified direction is closer to the vertical direction.

Next, referring to FIGS. 8 to 10, an outline of the process for calculating pointing coordinates (the coordinates representing a position that is pointed by the controller 5) performed by the game device 3 will be provided. In the present embodiment, the user (player) can perform a pointing operation of specifying a position in a space or on a surface using the controller 5. The user performs game operations by performing operations on the controller 5 including the pointing operation.

First, an outline of the method for calculating the pointing coordinates will be provided. FIG. 8 is a diagram showing a predetermined space that is set for calculating the pointing coordinates. In FIG. 8, the controller 5 and the coordinate surface Q are arranged in the predetermined space (virtual space). The predetermined space may represent a real space or may represent a game space. That is, a spatial coordinate system (X'Y'Z' coordinate system) for representing a position in the predetermined space may be set so as to represent a position in the real space or may be set so as to represent a position in a predetermined game space, etc. In the present embodiment, the spatial coordinate system is set so that the Y' axis extends in the vertical direction in the predetermined space (so that the Y'-axis negative direction coincides with the direction of gravity), while the X' axis and the Z' axis extend in the horizontal direction in the predetermined space. The coordinate surface Q is a surface that is defined by a planar coordinate system (a-b coordinate system) which is set for calculating pointing coordinates. That is, a planar coordinate system different from a spatial coordinate system is set on the coordinate surface Q, and a position on the coordinate surface Q is calculated as the pointing position. In the present embodiment, the position of the controller 5 is fixedly arranged in the predetermined space, and the coordinate surface Q is arranged at a position at a predetermined distance from the controller 5.

The game device 3 calculates the pointing coordinates based on the attitude of the controller 5. In the present embodiment, pointing coordinates are calculated based on the specified direction of the controller 5. The specified direction is a direction that is determined by the attitude of the controller 5. In the present embodiment, the specified direction is the longitudinal direction of the controller 5 having an elongated shape (the direction of the vector Z). As shown in FIG. 8, the game device 3 calculates pointing coordinates representing a position specified by the specified direction on the coordinate surface Q, which is defined by a planar coordinate system. Herein, the "position specified by the specified direction on the coordinate surface Q" is ideally the position of the intersection R between a straight line passing through the position of the controller 5 and extending in the specified direction and the coordinate surface Q. In practice, the game device 3 does not need to strictly calculate the coordinates of the intersection R as the pointing coordinates, but only needs to calculate the coordinates representing a position in the vicinity of the intersection R. As described above, in the present embodiment, since the user can change the pointing position by changing the specified direction of the controller 5, it is possible to easily perform the pointing operation using the controller 5. In other embodiments, as long as the pointing coordinates are calculated based on the attitude, the pointing coordinates may represent a position that changes in accordance with the attitude and is different from the position of the intersection R.

In the present embodiment, the user can set the coordinate surface Q (planar coordinate system) at an intended position. FIG. 9 is a diagram showing the controller 5 and the coordinate surface Q when setting the coordinate surface Q. When the user performs a predetermined setting operation on the controller 5, the game device 3 arranges the coordinate surface Q in front of the controller 5 in the specified direction at the time of the setting operation. As shown in FIG. 9, the coordinate surface Q is arranged so that the origin O is located along a straight line extended in the specified direction from the position of the controller 5. The coordinate surface Q is arranged at a position at a predetermined distance from the position of the controller 5 so that the coordinate surface Q is perpendicular to the specified direction. After the coordinate surface Q is arranged, the pointing coordinates are calculated using the arranged coordinate surface Q (planar coordinate system) until another setting operation is performed. Thus, by performing a setting operation with the controller 5 pointed in any direction, the user can perform the pointing operation with respect to the direction of the controller 5 at the time of the setting operation.

The game device 3 can set the direction of the coordinate axis of the planar coordinate system with respect to the predetermined space (with respect to the predetermined direction in the predetermined space), and can set the direction of the coordinate axis with respect to the controller 5 (with respect to the direction of the controller 5). In the present embodiment, the direction of the coordinate axis is set with respect to the predetermined direction in the predetermined space when the specified direction of the controller 5 is closer to the horizontal direction. Specifically, as shown in FIG. 9, the planar coordinate system is set so that the b axis, which corresponds to the upward direction of the coordinate surface Q, extends in the vertical direction (the Y'-axis positive direction) in the predetermined space.

FIG. 10 is a diagram showing the controller 5 and the coordinate surface Q at the time of the setting operation when the specified direction is closer to the vertical direction. In the present embodiment, the direction of the coordinate axis is set with respect to the direction of the controller 5 when the specified direction of the controller 5 is closer to the vertical direction. Specifically, as shown in FIG. 10, the planar coordinate system is set so that the b axis, which corresponds to the upward direction of the coordinate surface Q, extends in the upward direction (the vector Y) in the controller 5. Also when the specified direction of the controller 5 is closer to the vertical direction, as when the specified direction is closer to the horizontal direction, the coordinate surface Q is arranged at a position at a predetermined distance from the position of the controller 5 in the specified direction so that the coordinate surface Q is perpendicular to the specified direction.

As described above, in the present embodiment, the direction of the coordinate axis of the coordinate surface Q is determined in accordance with the specified direction at the time of the setting operation. That is, the game device 3 sets the direction of the coordinate axis with respect to the vertical direction in the predetermined space when the specified direction is closer to the horizontal direction than the predetermined reference (FIG. 9), and sets the direction of the coordinate axis with respect to the predetermined direction of the controller 5 when the specified direction is closer to the vertical direction than the predetermined reference (FIG. 10). That is, the game device 3 sets the direction of the coordinate axis by selectively using one of two different references depending on the specified direction.

With a method of setting the direction of the coordinate axis using a single reference, the direction of the coordinate axis may not be set appropriately in some cases. For example, with a method of setting the direction of the coordinate axis always with respect to the predetermined direction in the predetermined space, the direction of the coordinate axis may not be set appropriately when the specified direction of the controller 5 is close to the vertical direction (FIG. 10). That is, with such a method, when the specified direction is close to the vertical direction, the direction of the coordinate axis will change substantially for a small change in the specified direction, because the difference between the specified direction and the vertical direction. Therefore, even with a slight error in the calculated attitude of the controller 5, or a slight difference between the attitude intended by the user and the attitude that is calculated actually, the direction of the coordinate axis will be substantially different from the direction intended by the user. As a result of the direction of the coordinate axis being set in a direction not intended by the user, the user will feel awkward about the pointing operation. When the specified direction coincides with the vertical direction, the direction of the coordinate axis cannot be determined with respect to the vertical direction, and it is therefore not possible to appropriately set the direction of the coordinate axis.

For example, with a method of setting the direction of the coordinate axis always with respect to the predetermined direction of the controller 5, the direction of the coordinate axis may not be set appropriately when the specified direction of the controller 5 is close to the horizontal direction (FIG. 9). That is, with such a method, since the direction of the coordinate system changes depending on the direction of the controller 5, and therefore the direction of the coordinate system changes depending on how the controller 5 is being held by the user. For example, when the user is holding the controller 5 so that the upward direction of the controller 5 extends in the horizontal direction in the predetermined space, the coordinate system will be set, with such a method, so that the upward direction of the coordinate system extends in the horizontal direction in the predetermined space. However, when the specified direction is close to the horizontal direction, it is believed that it is natural and non-awkward for the user that the direction in the predetermined space coincides with the direction of the coordinate system (specifically, the vertical direction in the predetermined space extends in the upward direction of the coordinate system), irrespective of the direction of the controller 5 or how the controller 5 is being held. That is, with such a method, when the specified direction is close to the horizontal direction, the upward direction of the coordinate system may change depending on how the controller 5 is held, thereby causing the user to feel awkward about the direction of the coordinate axis.

As described above, with a method of setting the direction of the coordinate axis using a single reference, the direction of the coordinate axis may not be set appropriately when the specified direction is in a certain direction, thereby causing the user to feel awkward about the direction of the coordinate system and thus deteriorating the controllability of the pointing operation.

In contrast, with the present embodiment, the game device 3 can set the direction of the coordinate axis using two different references. That is, the direction of the coordinate axis of the planar coordinate system is set with respect to the vertical direction in the predetermined space when the specified direction is closer to the horizontal direction than the predetermined reference (FIG. 9), and the direction of the coordinate axis is set with respect to the predetermined direction of the controller 5 when the specified direction is closer to the vertical direction than the predetermined reference (FIG. 10). Then, when the specified direction is closer to the horizontal direction than the predetermined reference, it is possible to set an appropriate coordinate system for the user by setting the coordinate system so that the direction in the predetermined space coincides with the direction in the coordinate system (specifically, the vertical direction in the predetermined space extends in the upward direction of the coordinate system). When the specified direction is closer to the vertical direction than the predetermined reference, it is possible to set an appropriate coordinate system for the user by setting the direction of the coordinate axis in accordance with the direction of the controller 5. Thus, with the present embodiment, it is possible to appropriately set the coordinate system whether the specified direction is closer to the horizontal direction or closer to the vertical direction, thus providing the user with a pointing operation with good controllability.

[6. Details of Game Processes]

Figure 11:
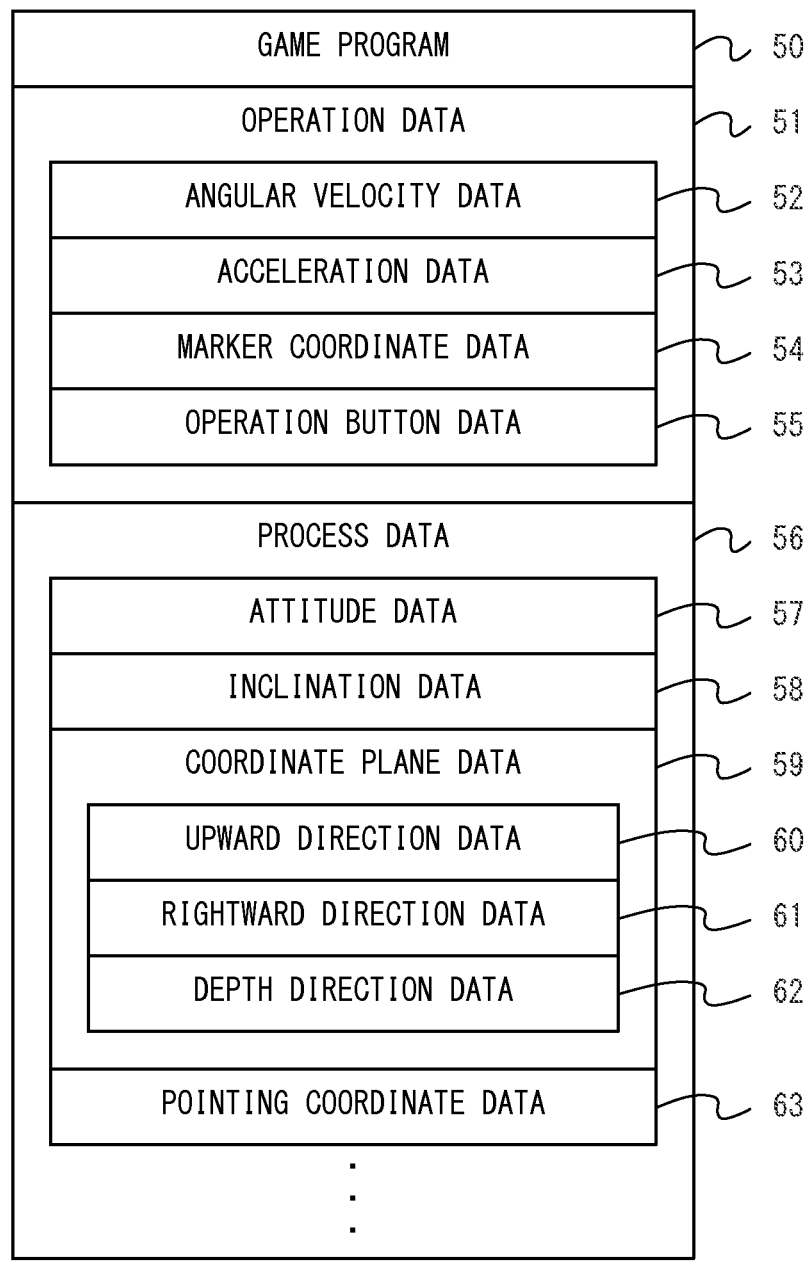
FIG. 11 is a diagram showing primary data stored in a main memory of the game device.

Next, the details of game processes (information processes) performed by the present game system 1 will be described. First, various data used in the game process will be described. FIG. 11 shows primary data to be stored in the main memory (the external main memory 12 or the internal main memory 11e) of the game device 3. As shown in FIG. 11, the main memory of the game device 3 stores a game program 50, operation data 51 and process data 56. In addition to those shown in FIG. 11, the main memory also stores other data used in the game, such as image data of various objects appearing in the game, and sound data used in the game, etc. The storage unit for storing the various data shown in FIG. 11 may be any storage unit, and some of the various data may be stored in other embodiments in the flash memory 17, the VRAM 11d, or the like.

The game program 50 is obtained by the game device 3 by any suitable method, and executed on the game device 3. In the present embodiment, at an appropriate point in time after the power of the game device 3 is turned ON, a part or whole of the game program 50 is loaded from the optical disc 4 and stored in the main memory. The game program 50 may be obtained from the flash memory 17 or an external device of the game device 3 (e.g., via the Internet), instead of from the optical disc 4. A part of the game program 50 (e.g., a program for calculating the attitude of the controller 5) may be pre-stored in the game device 3.

The operation data 51 is data representing operations performed by the user (player) on the controller 5. The operation data 51 is transmitted from the controller 5 to be received (obtained) by the game device 3 and stored in the main memory. The game device 3 is capable of communicating with a plurality of controllers, and is capable of obtaining operation data from each of the controllers. Where there are a plurality of controllers, operation data transmitted from each controller is stored separately in the main memory. The main memory may store a predetermined number of latest (most recently obtained) sets of operation data for each of the controllers 5. In the present embodiment, the operation data 51 includes angular velocity data 52, acceleration data 53, marker coordinate data 54, and operation button data 55.

The angular velocity data 52 is data representing the angular velocity detected by the gyrosensor 48. The angular velocity data 52 may be any data representing the angular velocity of the controller 5, and represents the angular velocity about each of the three axes of X, Y and Z shown in FIG. 3 in the present embodiment. The angular velocity data 52 may represent angular velocity about any one or more directions in other embodiments.

The acceleration data 53 is data representing the acceleration (acceleration vector) detected by the acceleration sensor 37. The acceleration data 53 may be any data representing the acceleration of the controller 5, and represents a three-dimensional acceleration vector of which each component is the acceleration for one of the three axes of X, Y and Z shown in FIG. 3 in the present embodiment. The acceleration data 53 may represent the acceleration for any one or more directions in other embodiments.

The marker coordinate data 54 is data representing coordinates calculated by the image processing circuit 41 of the image capturing/processing section 35, i.e., the marker coordinates. The marker coordinates are represented in a two-dimensional coordinate system for representing a position on a surface corresponding to the captured image. Depending on whether each of the markers 6R and 6L is included within the range that can be captured by the image capturing element 40, the marker coordinate data 54 may represent two sets of marker coordinates, represent one set of marker coordinates, or indicate that there is no marker coordinate.

The operation button data 55 is data representing the input status of the operation buttons 32a to 32i.

As long as the operation data 51 represents an operation performed by the player on the controller 5, it may include only some of the data included in the operation data 51 in the present embodiment. In a case in which the controller 5 includes another input unit (e.g., a touch panel, an analog stick, or the like), the operation data 51 may include data representing the operation on the other input unit. In a case in which the attitude of the controller 5 itself is used as the game operation, the operation data 51 includes data whose value varies based on the attitude of the controller 5 itself, such as the angular velocity data 52, the acceleration data 53 or the marker coordinate data 54.

Figure 12:
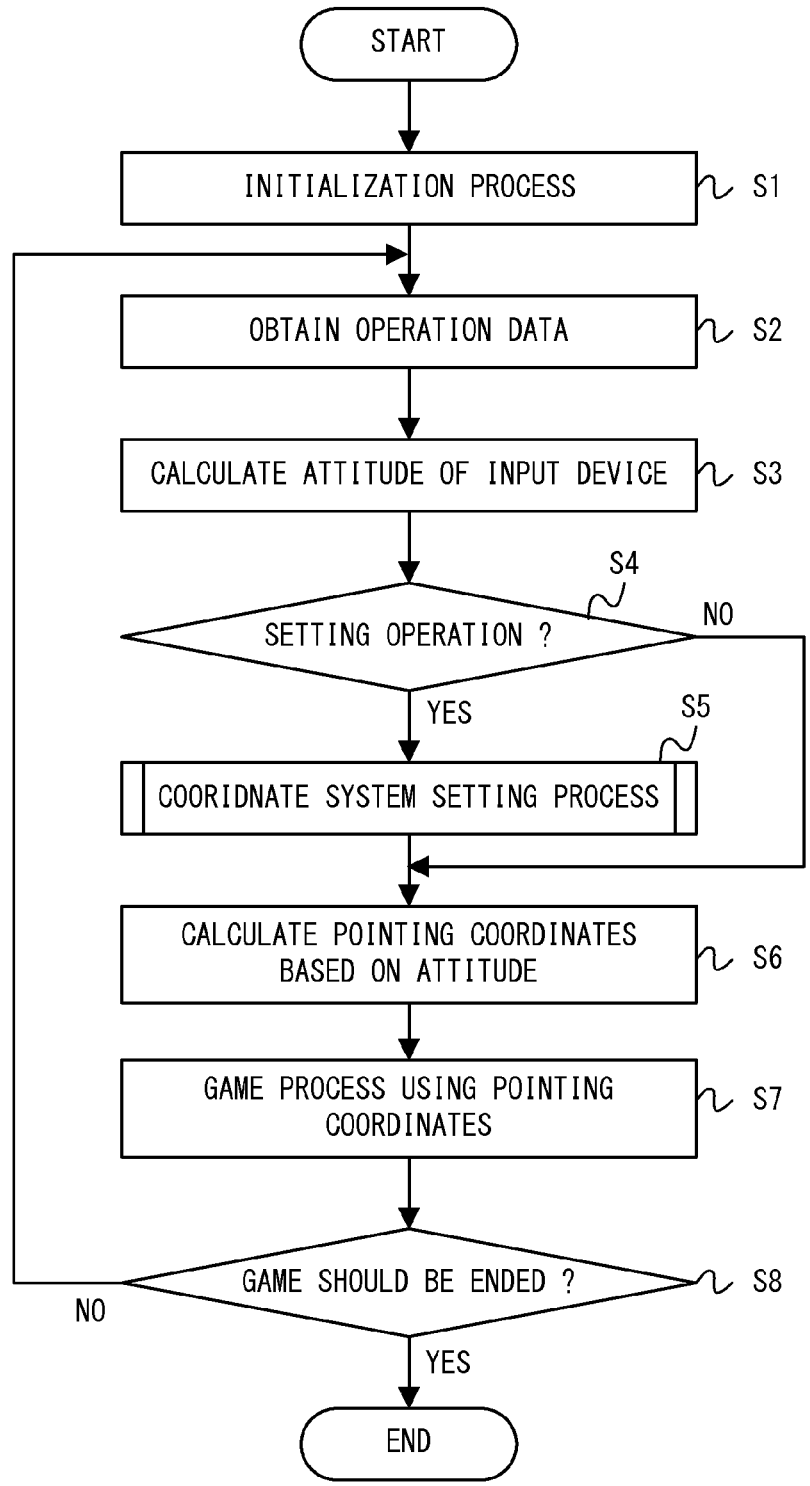
FIG. 12 is a main flow chart showing an example flow of a game process performed by the game device.

The process data 56 is data used in game processes to be described below (FIG. 12). The process data 56 includes attitude data 57, inclination data 58, coordinate surface data 59, and pointing coordinate data 63. In addition to the data shown in FIG. 11, the process data 56 includes various data used in game processes such as data representing various parameters set for various objects appearing in the game.

The attitude data 57 is data representing the attitude of the controller 5. For example, the attitude of the controller 5 may be expressed by a rotation matrix that represents the rotation from a predetermined reference attitude to the current attitude, or may be expressed by a third-order vector or three angles. While an attitude in a three-dimensional space is used as the attitude of the controller 5 in the present embodiment, an attitude in a two-dimensional surface may be used in other embodiments. In the present embodiment, the attitude data 57 is calculated based on the angular velocity data 52, the acceleration data 53 and the marker coordinate data 54 included in the operation data 51. The method for calculating the attitude data 57 will be later described in step S3.

The inclination data 58 is data representing the inclination of the specified direction of the controller 5. The inclination indicates the degree by which the specified direction is inclined with respect to the vertical direction (or the horizontal direction) in the predetermined space. The inclination data 58 is calculated based on the attitude data 57.

The coordinate surface data 59 is data representing the attitude of the coordinate surface Q described above. The coordinate surface data 59 includes upward direction data 60, rightward direction data 61, and depth direction data 62. The upward direction data 60 represents the upward direction in the coordinate surface Q (a-b coordinate system), and specifically represents a unit vector that extends in the b-axis positive direction. The rightward direction data 61 represents the rightward direction in the coordinate surface Q (a-b coordinate system), and specifically represents a unit vector that extends in the a-axis positive direction. The depth direction data 62 represents the depth direction in the coordinate surface Q (a-b coordinate system), and specifically represents a unit vector that is perpendicular to the coordinate surface Q and extends from the position of the controller 5 toward the origin O. The coordinate surface data 59 is calculated based on the attitude data 57 and the inclination data 58.

The pointing coordinate data 63 is data representing the pointing coordinates described above. That is, the pointing coordinate data 63 represents two-dimensional coordinates in the a-b coordinate system. The pointing coordinate data 63 is calculated based on the attitude data 57 and the coordinate surface data 59.

Next, the details of the game processes performed by the game device 3 will be described with reference to FIGS. 12 to 17. FIG. 12 is a main flow chart showing the flow of the game processes performed by the game device 3. When the power of the game device 3 is turned ON, the CPU 10 of the game device 3 executes a boot program stored in a boot ROM (not shown), so as to initialize each unit, including the main memory. Then, the game program stored in the optical disc 4 is loaded to the main memory, and the CPU 10 starts executing the game program. The flow chart shown in FIG. 12 is a flow chart showing the process to be performed after processes described above are completed. The game device 3 may be configured to execute the game program immediately after power-up, or it may be configured so that a built-in program is executed after power-up for displaying a predetermined menu screen first, and then the game program is executed when the start of the game is instructed by, for example, a selection operation on the menu screen by the player.

The processes of the steps of the flow chart (FIG. 12 and FIG. 13) to be described below are merely illustrative, and the order of steps to be performed may be switched around as long as similar results are obtained. The values of the variables, and the threshold values used in determination steps are also merely illustrative, and other values may be used as necessary. While the present embodiment is described assuming that the processes of the steps of the flowchart are performed by the CPU 10, processes of some of the steps of the flow chart may be performed by a processor or a dedicated circuit other than the CPU 10.

First, in step S1, the CPU 10 performs an initialization process. The initialization process is a process of constructing a virtual game space, placing objects appearing in the game space at their initial positions, and setting initial values of various parameters used in the game processes. In the present embodiment, in the initialization process, a coordinate surface is set at a predetermined initial position and in a predetermined initial attitude. That is, data representing the predetermined initial position and the predetermined initial attitude is stored in the main memory as the coordinate surface data 59. In other embodiments, the coordinate surface may not be set in the initialization process. In the process loop of steps S2 to S8 to be described later, the process (step S6) of calculating the pointing coordinates does not have to be performed until the first setting operation is performed. The process of step S2 is performed, following step S1. Thereafter, the process loop including a series of processes of steps S2 to S8 is repeatedly performed at a rate of once per a predetermined amount of time (a one frame period).

In step S2, the CPU 10 obtains operation data from the controller 5. That is, since the controller 5 repeatedly transmits as the operation data to the game device 3, the wireless controller module 19 of the game device 3 successively receives the operation data, the received operation data is successively stored in the main memory by the input/output processor 11a. The operation data 51 stored in the main memory is read out at an appropriate point in time during the process of steps S3 to S7 to be described below. The process of step S3 is performed, following step S2.

In step S3, the CPU 10 calculates the attitude of the controller 5. In the present embodiment, the attitude of the controller 5 is calculated based on a physical quantity for calculating an attitude, which is represented by the operation data 51. In the present embodiment, the angular velocity represented by the angular velocity data 52, the acceleration represented by the acceleration data 53, and the marker coordinates represented by the marker coordinate data 54 are used as physical quantities for calculating an attitude. The details of the attitude calculation process will be described below.

In the attitude calculation process, first, the CPU 10 calculates the attitude of the controller 5 based on the angular velocity data 52. While the method for calculating the attitude based on the angular velocity may be any method, the attitude is calculated using the previous attitude (the attitude calculated in step S3 in a previous iteration of the process loop) and the current angular velocity (the angular velocity obtained in step S2 in a current iteration of the process loop). Specifically, the CPU 10 calculates the attitude by rotating the previous attitude by a unit time's worth of the current angular velocity. The data representing the calculated attitude is stored in main memory.

Where the attitude is calculated from the angular velocity, it is preferred that an initial attitude is set. That is, where the attitude of the controller 5 is calculated from the angular velocity, the CPU 10 initially sets the initial attitude of the controller 5. The initial attitude of the controller 5 may be calculated based on the acceleration data 53, or the player may be prompted to perform a predetermined operation with the controller 5 in a particular attitude so that the particular attitude at the point in time when the predetermined operation is performed is set as the initial attitude. The initial attitude may be calculated in a case in which the attitude of the controller 5 is calculated as an absolute attitude with respect to a predetermined direction in the space. On the other hand, the initial attitude does not have to be calculated in a case in which the attitude of the controller 5 is calculated as a relative attitude with respect to the attitude of the controller 5 at the start of the game, for example.

Once the attitude is calculated based on the angular velocity, the CPU 10 then adjusts the calculated attitude based on the acceleration of the controller 5. In a state in which the controller 5 is substantially stationary, the acceleration acting upon the controller 5 means the gravitational acceleration. That is, in this state, the acceleration vector represented by the acceleration data 53 represents the direction of gravity in the controller 5. Therefore, the CPU 10 makes an adjustment such that the downward direction (the direction of gravity) of the attitude calculated based on the angular velocity is brought closer to the direction of gravity represented by the acceleration vector. That is, the attitude is rotated so that the downward direction is brought closer to the direction of gravity represented by the acceleration vector at a predetermined rate. Thus, the attitude based on the angular velocity can be adjusted to an attitude based on the acceleration with the direction of gravity taken into consideration. The predetermined rate may be a predetermined fixed value or may be set in accordance with the detected acceleration, etc.

Once an adjustment based on acceleration is made, the CPU 10 next adjusts the attitude of the controller 5 based on marker coordinates. First, the CPU 10 calculates the attitude of the controller 5 based on the marker coordinates. Since the marker coordinates represent positions of two markers (the markers 6L and 6R, or the markers 55A and 55B) in the captured image, the attitude of the controller 5 can be calculated based on these positions. Next, the CPU 10 adjusts the attitude based on the angular velocity using the attitude based on the marker coordinates. Specifically, the CPU 10 makes an adjustment such that the attitude based on the angular velocity is brought closer to the attitude based on the marker coordinates at a predetermined rate. The predetermined rate is a predetermined fixed value, for example. The adjusted attitude obtained as described above is used as the attitude of the controller 5. That is, data representing the adjusted attitude is stored in the main memory as the attitude data 57. While the attitude of the controller 5 may be represented in any form, the attitude in the present embodiment is represented in a form including a vector that represents the tail-to-tip direction of the controller 5 in a predetermined space (the vector Z to be described below) and a vector that represents the upward direction of the controller 5 (the vector Y described below). In the present embodiment, it is assumed that each of the vector Y and the vector Z is normalized to a unit vector having a length of 1. The process of step S4 is performed, following step S3.

As described above, in the present embodiment, the controller 5 includes a sensor unit, including the gyrosensor 48 and the acceleration sensor 37, and the game device 3 calculates the attitude of the controller 5 based on the detection result of the sensor unit (the angular velocity data 52 and the acceleration data 53). Thus, it is possible to calculate the attitude of the controller 5, irrespective of the direction of the controller 5. While the attitude of the controller 5 is calculated based on three sets of information, i.e., the angular velocity, the acceleration and the marker coordinates, in the present embodiment, the attitude may be calculated based on one or two of the three sets of information in other embodiments. In other embodiments, the attitude may be calculated based on information other than the three sets of information described above. For example, where the game system 1 includes a camera for capturing an image of the controller 5, the game device 3 may obtain the image-capturing result obtained by the camera to calculate the attitude of the controller 5 using the image-capturing result.

In step S4, the CPU 10 determines whether a predetermined condition for setting the coordinate system has been satisfied. The predetermined condition may be any condition, and it is the execution of a predetermined setting operation in the present embodiment. That is, in step S4, the CPU 10 determines whether the setting operation has been performed. The setting operation is an operation of setting (or re-setting) the coordinate surface Q for calculating the pointing coordinates. The setting operation may be any operation, and it is an operation of pressing a predetermined button (e.g., the B button 32i) of the controller 5 in the present embodiment. The CPU 10 reads out the operation data 51 from the main memory to determine whether the setting operation has been performed based on the operation data 51. If the determination result of step S4 is affirmative, the process of step S5 is performed. On the other hand, if the determination result of step S4 is negative, the process of step S6 is performed, skipping the process of step S5.

In other embodiments, the predetermined condition may be a condition related to the game. Specifically, in a game in which use of a particular item enables the pointing operation, the game device 3 may use, as the predetermined condition, the obtainment of the item or the start of use of the item.

In step S5, the CPU 10 performs the coordinate system setting process. The coordinate system setting process is a process of setting a planar coordinate system (the coordinate surface Q) for calculating the pointing coordinates in a predetermined space. That is, in the present embodiment, a planar coordinate system is set in response to the execution of the setting operation. Where a planar coordinate system has already been set, a planar coordinate system is re-set in response to the execution of the setting operation.

In the present embodiment, in the coordinate system setting process, the CPU 10 sets the direction of the coordinate axis with respect to the vertical direction in the predetermined space when the specified direction of the controller 5 is closer to the horizontal direction than the predetermined reference (the inclination A=1, to be described below). The CPU 10 sets the direction of the coordinate axis with respect to the predetermined direction of the controller 5 when the specified direction is closer to the vertical direction than the predetermined reference (the inclination A=0). With such a coordinate system setting process, it is possible to set the coordinate system in an appropriate direction both when the specified direction is close to the horizontal direction and when the specified direction is close to the vertical direction. The details of the coordinate system setting process will now be described with reference to FIG. 13.

Figure 13:
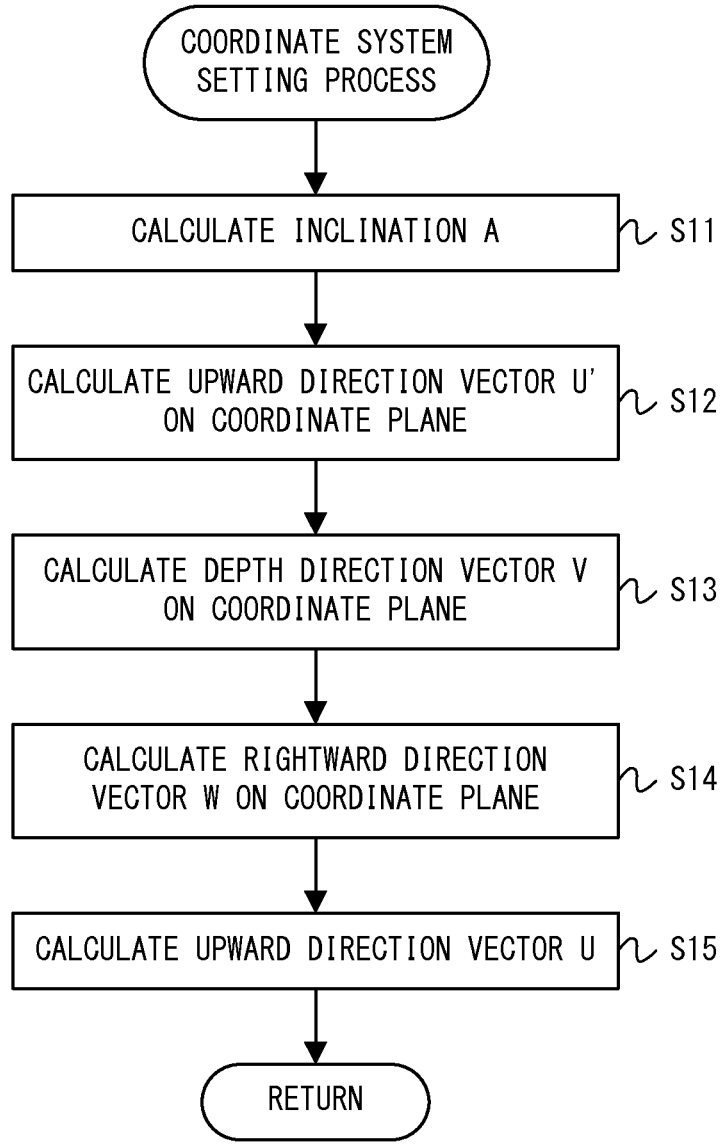
FIG. 13 is a flow chart showing an example detailed flow of a coordinate system setting process (step S5) shown in FIG. 12.

FIG. 13 is a flow chart showing a detailed flow of the coordinate system setting process (step S5) shown in FIG. 12. In the coordinate system setting process, first, in step S11, the CPU 10 calculates the inclination A of the specified direction of the controller 5. The inclination A represents the degree by which the specified direction is inclined with respect to the horizontal direction (or the vertical direction) in the predetermined space. In the coordinate system calculation process of the present embodiment, the CPU 10 sets the coordinate system so that the predetermined axis (the b axis) of the coordinate system is closer to the vertical direction as the specified direction of the controller 5 is closer to the horizontal direction in the predetermined space, and so that the predetermined axis is closer to the predetermined direction (upward direction) of the controller 5 as the specified direction is closer to the vertical direction. The inclination A is calculated so as to be used as an indicator indicating whether the specified direction is closer to the horizontal direction (or the vertical direction) in the predetermined space. The inclination A is calculated based on the attitude of the controller 5 calculated in step S3. The method for calculating the inclination A will now be described with reference to FIG. 14.

Figure 14:
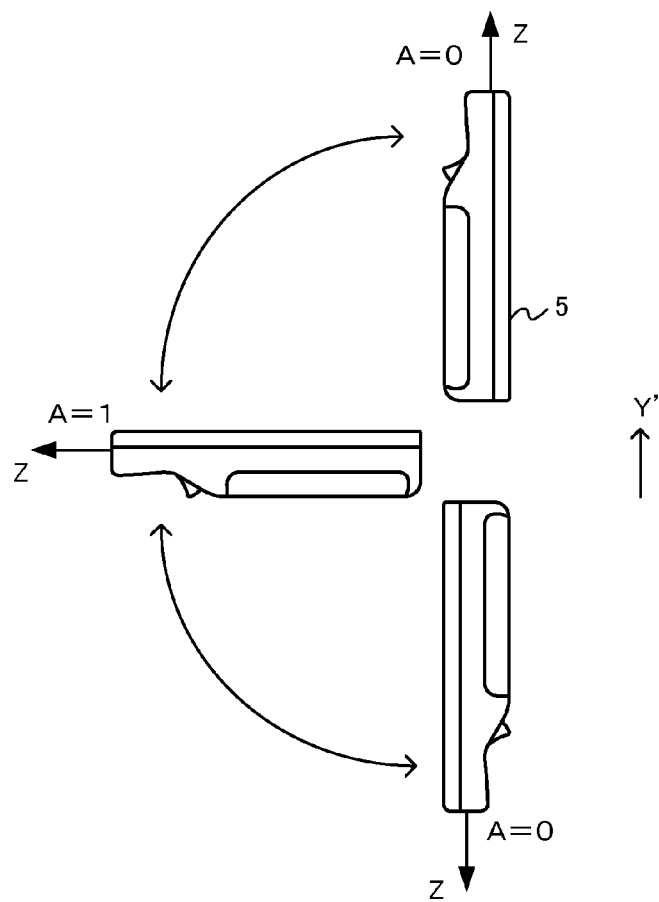
FIG. 14 is a diagram showing an example relationship between an attitude of the controller and the inclination A.

FIG. 14 is a diagram showing a relationship between the attitude of the controller 5 and the inclination A. The inclination A may be calculated by any method as long as it is calculated so as to represent the degree by which the specified direction is inclined with respect to the vertical direction in the predetermined space (the Y'-axis direction shown in FIG. 14) or the horizontal direction. In the present embodiment, the inclination A is calculated using the vector Z representing the specified direction (herein the tail-to-tip direction of the controller 5). Specifically, as shown in FIG. 14, the CPU 10 calculates the inclination A so that the inclination A takes the maximum value (herein "1") when the specified direction (the vector Z) extends in the horizontal direction, gradually decreases as the specified direction comes closer to the vertical direction, and takes the minimum value (herein "0") when the specified direction extends in the vertical direction. Specifically, the inclination A is calculated by Expression (1) below.

$$A = 1 - Zy \times Zy \qquad (1)$$

The variable Zy in Expression (1) above is the value of the Y'-component of the vector Z. In the present embodiment, as shown in Expression (1) above, the inclination A takes a value close to "1" when the specified direction is in the middle between the horizontal direction and the vertical direction, as well as when the specified direction is close to the horizontal direction. As a specific process of step S11, the CPU 10 reads out the attitude data 57 from the main memory, and calculates the inclination A by Expression (1) above using the vector Z. Then, data representing the calculated inclination A is stored in the main memory as the inclination data 58. The process of step S12 is performed, following step S11.

In step S12, the CPU 10 calculates the vector U' corresponding to the upward direction (the b axis) of the coordinate surface Q to be set. The vector U' calculated in step S12 is a vector corresponding to the upward direction, and does not need to accurately represent the upward direction. Herein, the vector U' is such a vector that the vector U' as projected onto the coordinate surface Q represents the upward reaction (the b axis) of the coordinate surface Q. In the present embodiment, the upward direction of the coordinate surface Q is set with respect to the vertical direction in the predetermined space or the upward direction of the controller 5. Therefore, the vector U' is calculated based on the vector P extending in the vertical direction and the vector Y representing the upward direction of the controller 5. The method for calculating the vector U' will now be described with reference to FIG. 15.

Figure 15:
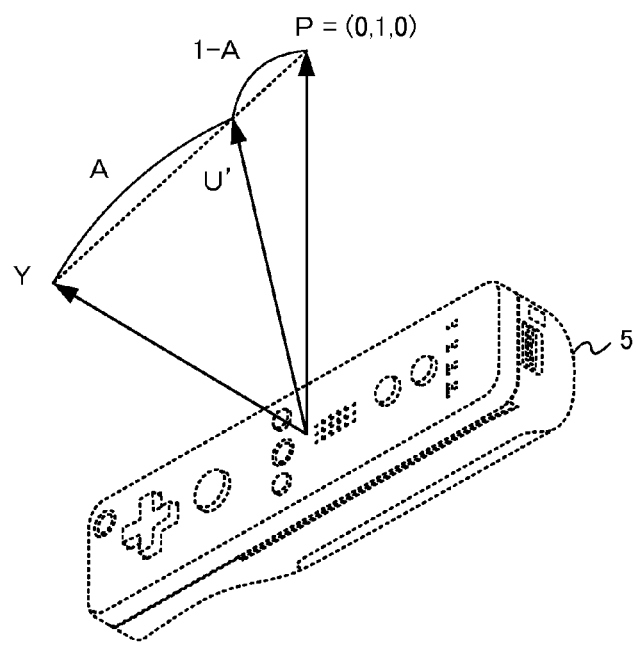
FIG. 15 is a diagram showing an example relationship between the vector P, the vector Y and the vector U'.

FIG. 15 is a diagram showing the relationship between the vector P, the vector Y and the vector U'. In FIG. 15, the button surface side of the controller 5 is defined as the upper side of the controller 5, and the direction of the vector Y perpendicular to the button surface is defined as the upward direction of the controller 5. Note however that the upward direction of the controller 5 is not limited to the direction of the vector Y, but may be a predetermined direction with respect to the controller 5. For example, in other embodiments, where the user may perform game operations with the button surface (the vector Y) of the controller 5 lying in the horizontal direction, the game device 3 may perform processes while the side surface direction of the controller 5 (the X-axis direction shown in FIG. 3) is defined as the upward direction of the controller 5. In the present embodiment, the vector P is a unit vector (=(0,1,0)) extending in the Y'-axis positive direction.

As shown in FIG. 15, the direction of the vector U' is calculated as extending in the vertical direction in the predetermined space (the vector P), in the upward direction of the controller 5 (the vector Y), or in a direction between these two directions. The vector U' is calculated so as to be closer to the vertical direction as the inclination A is larger, and closer to the upward direction of the controller 5 as the inclination A is smaller. Specifically, the vector U'=(Ux',Uy',Uz') is calculated by Expression (2) below.

$$Ux'=(0-Yx) \times A + Yx$$

$$Uy'=(1-Yy) \times A + Yy$$

$$Uz'=(0-Yz) \times A + Yz \quad (2)$$

In Expression (2) above, the variable Yx, Yy and Yz are the X'-component value, the Y'-component value and the Z'-component value, respectively, of the vector Y. As shown in Expression (2) above, the final point of the vector U' internally divides the segment between the final point of the vector Y and the final point of the vector P in the ratio A: (1−A).

As a specific process of step S12, the CPU 10 reads out the attitude data 57 and the inclination data 58 from the main memory, and calculates the vector U' by Expression (2) above using the component values of the vector Y and the inclination A. Then, data representing the calculated vector U' is stored in the main memory as the upward direction data 60. The process of step S13 is performed, following step S12.

By step S12 described above, the vector U' is calculated, which corresponds to the upward direction (the b axis) of the planar coordinate system (the coordinate surface Q). Where the inclination A=1, the vector U' coincides with the vector P. That is, the upward direction of the planar coordinate system extends in the vertically upward direction in the predetermined space, and the upward direction of the planar coordinate system extends in the vertically downward direction (direction of gravity) in the predetermined space. On the other hand, where the inclination A=0, the vector U' coincides with the vector Y. That is, the upward direction (downward direction) of the planar coordinate system extends in the upward direction (downward direction) of the controller 5.

The direction of the vector U' does not always coincide with the upward direction of the coordinate surface Q as described above, and the vector U' is not always parallel to the coordinate surface Q. Therefore, in the present embodiment, in the process of steps S13 to S15 to be described below, the CPU 10 calculates the upward direction vector U representing the upward direction of the coordinate surface Q based on the vector U' (adjusts the vector U' to the vector U).

Figure 16:
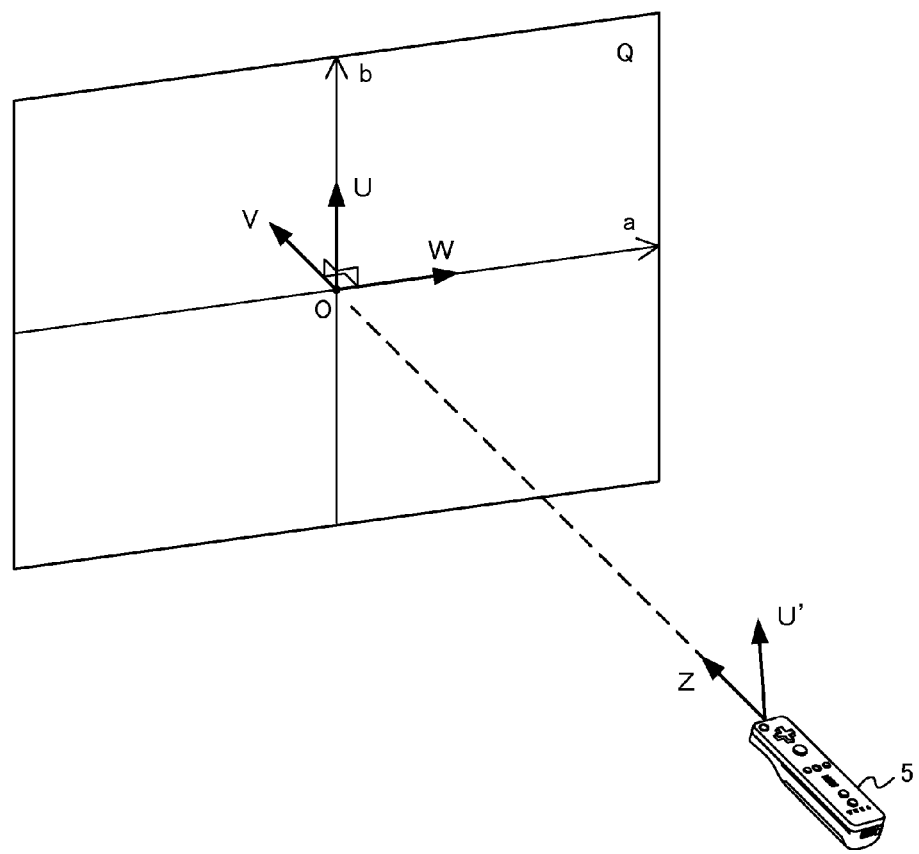
FIG. 16 is a diagram showing example vectors Z and U', which represent the attitude of the controller, and example vectors U, V and W, which represent the attitude of the coordinate surface Q.

In step S13, the CPU 10 calculates the depth direction vector V of the coordinate surface Q to be set. The depth direction vector V represents a direction that is perpendicular to the coordinate surface Q and extends from the position of the controller 5 toward the origin O. FIG. 16 is a diagram showing the vectors Z and U' representing the attitude of the controller 5, and vectors U, V and W representing the attitude of the coordinate surface Q. As shown in FIG. 16, the depth direction vector V coincides with the vector Z representing the specified direction of the controller 5. That is, the depth direction vector V=(Vx,Vy,Vz) is calculated by Expression (3) below.

$$Vx=Zx$$

$$Vy=Zy$$

$$Vz=Zz \quad (3)$$

In Expression (3) above, the variable Zx, Zy and Zz are the X'-component value, the Y'-component value and the Z'-component value, respectively, of the vector Z. As a specific process of step S13, the CPU 10 reads out the attitude data 57 from the main memory, and calculates the vector V by Expression (3) above using the component values of the vector Z. Then, data representing the calculated vector V is stored in the main memory as the depth direction data 62. The process of step S14 is performed, following step S13.

In step S14, the CPU 10 calculates the rightward direction vector W of the coordinate surface Q to be set. The rightward direction vector W represents the rightward direction (a-axis positive direction) of the coordinate surface Q. The rightward direction vector W is calculated so that the rightward direction vector W is perpendicular to the vector U' and is perpendicular to the depth direction vector V (see FIG. 16). Specifically, the rightward direction vector W=(Wx, Wy, Wz) is calculated by Expression (4) below.

$$Wx = Vz \times Uy' - Vy \times Uz'$$

$$Wy = Vx \times Uz' - Vz \times Ux'$$

$$Wz = Vy \times Ux' - Vx \times Uy' \quad (4)$$

As shown in Expression (4) above, the rightward direction vector W is calculated as the outer product between the depth direction vector V and the vector U'. As a specific process of step S14, the CPU 10 reads out the upward direction data 60 and the depth direction data 62 from the main memory, and calculates the rightward direction vector W by Expression (4) above using the vector U' and the depth direction vector V. Then, the CPU 10 normalizes the calculated rightward direction vector (so that the length thereof is 1). Data representing the normalized rightward direction vector W is stored in the main memory as the rightward direction data 61. The process of step S15 is performed, following step S14.

In step S14, where the vector U' and the depth direction vector V are the same direction, the outer product between the depth direction vector V and the vector U' is "0", and the rightward direction vector W cannot be calculated. Therefore, in such a case, the CPU 10 may perform the coordinate system setting process again based on an attitude that is calculated in the previous iteration (the attitude calculated in step S3 in the previous iteration of the process loop). Alternatively, the CPU 10 may perform the coordinate system setting process again based on an attitude that is calculated in the following iteration (the attitude calculated in step S3 in the following iteration of the process loop). Or, in such a case, the setting operation may be nullified. That is, in such a case, the CPU 10 may discontinue the coordinate system setting process so that no coordinate system is set.

In step S15, the CPU 10 calculates the upward direction vector U of the coordinate surface Q to be set. The upward direction vector U represents the upward direction of the coordinate surface Q (b-axis positive direction). As shown in FIG. 16, the upward direction vector U is calculated so that the upward direction vector U is perpendicular to the depth direction vector V and is perpendicular to the rightward direction vector W. Specifically, the upward direction vector W=(Ux,Uy,Uz) is calculated by Expression (5) below.

$$Ux = Wz \times Vy - Wy \times Vz$$

$$Uy = Wx \times Vz - Wz \times Vx$$

$$Uz = Wy \times Vx - Wx \times Vy \quad (5)$$

As shown in Expression (5) above, the upward direction vector U is calculated as the outer product between the rightward direction vector W and the depth direction vector V. As a specific process of step S15, the CPU 10 reads out the rightward direction data 61 and the depth direction data 62 from the main memory, and calculates the upward direction vector U by Expression (5) above using the rightward direction vector W and the depth direction vector V. Then, data representing the calculated upward direction vector U is stored in the main memory as the upward direction data 60. After step S15, the CPU 10 ends the coordinate system setting process.

As described above, in the coordinate system setting process, the inclination A is calculated so that the inclination A takes the maximum value when the specified direction of the controller 5 extends in the horizontal direction in the predetermined space, gradually decreases as the specified direction comes closer to the vertical direction in the predetermined space, and takes the minimum value when the specified direction extends in the vertical direction (step S11). Then, the vector U' is calculated so as to be closer to the vertical direction as the inclination A is larger and closer to the upward direction of the controller 5 as the inclination A is smaller (step S12). As a result, setting is done so that the b axis representing the upward direction of the coordinate surface Q is closer to the vertical direction as the specified direction is closer to the horizontal direction, and closer to the upward direction of the controller 5 as the specified direction is closer to the vertical direction (step S15).

In the present embodiment, when the specified direction extends in the horizontal direction, the CPU 10 sets the planar coordinate system so that the downward direction in the planar coordinate system extends in the direction of gravity in the predetermined space. When the specified direction extends in the vertical direction, the planar coordinate system is set so that the downward direction in the planar coordinate system extends in the downward direction of the controller 5. Therefore, in the present embodiment, it is possible to set the upward direction so that the user does not feel awkward both when the specified direction extends in the horizontal direction and when the specified direction extends in the vertical direction. Thus, it is possible to improve the controllability of the pointing operation.

In the present embodiment, the setting is done so that the direction of the planar coordinate system at the time of the setting operation varies continuously in accordance with the specified direction of the controller 5 at the time of the setting operation. That is, the planar coordinate system is set so that the predetermined axis (the b axis) is closer to the vertical direction as the specified direction is closer to the horizontal direction, and so that the predetermined axis is closer to the predetermined direction (upward direction) of the controller 5 as the specified direction is closer to the vertical direction. In other words, the upward direction of the planar coordinate system extends generally in the vertical direction when the specified direction is close to the horizontal direction, and the upward direction of the planar coordinate system extends generally in the upward direction of the controller 5 when the specified direction is close to the vertical direction. Therefore, in the present embodiment, where the specified direction can be any arbitrary direction, the planar coordinate system is set in a direction that is not awkward for the user.

In other embodiments, the direction of the planar coordinate system at the time of the setting operation is not limited to a direction that varies continuously in accordance with the specified direction. For example, in other embodiments, the CPU 10 may determine whether the predetermined axis of the planar coordinate system extends in the vertical direction or the predetermined axis extends in the predetermined direction of the controller 5, depending on whether the specified direction is closer to the horizontal direction or to the vertical direction than the predetermined reference. Specifically, the planar coordinate system may be set so that the predetermined axis (the b axis) extends in the vertical direction in the predetermined space when the inclination A is greater than a predetermined threshold, and the predetermined axis (the b axis) extends in the predetermined direction of the controller 5 when the inclination A is less than or equal to the threshold. Then, as in the present embodiment, where the specified direction can be any arbitrary direction, the planar coordinate system can be set in a direction that is not awkward for the user.

In the present embodiment, "a direction in the planar coordinate system", such as the upward direction or the downward direction of the planar coordinate system, typically corresponds to a direction that is specified by a pointing operation by the user. For example, when a pointing operation for the downward direction of the planar coordinate system (e.g., an operation of moving the pointing coordinates in the downward direction) is performed, the game device 3 determines that a downward direction instruction has been made by the user, and accordingly performs a process of, for example, moving the cursor in the downward reaction of the screen. Note however that the direction in the coordinate system does not always have to correspond to the direction specified by a pointing operation by the user.

In the coordinate system setting process, the coordinate surface Q (a-b coordinate system) is considered set as the upward direction vector U, the rightward direction vector W and the depth direction vector V are calculated. In the present embodiment, the pointing coordinates are calculated by a method not using the position of the origin O in the process of calculating pointing coordinates (step S6) to be described below, and therefore the position of the origin O is not calculated in the coordinate system setting process. Note however that the position of the controller 5 and the distance from the controller 5 to the coordinate surface Q are predetermined in the present embodiment, and therefore the position of the origin O is uniquely determined by the position of the controller 5, the distance and the vector Z. That is, although the position of the coordinate surface Q is not explicitly calculated in the coordinate system setting process in the present embodiment, it can be said that the position of the coordinate surface Q is determined essentially. In other embodiments, the CPU 10 may perform a process of calculating the position of the coordinate surface Q (e.g., the position of the origin O) in the coordinate system setting process.

Referring back to FIG. 12, in step S6, the CPU 10 calculates the pointing coordinates based on the attitude of the controller 5. The pointing coordinates are calculated based on the relationship of the attitude of the controller 5 with respect to the planar coordinate system (the coordinate surface Q), which is set in step S4. While the specific method for calculating the pointing coordinates may be any method, the pointing coordinates are calculated based on the specified direction, which is determined by the attitude of the controller 5, in the present embodiment. Specifically, the CPU 10 calculates, as the pointing coordinates, coordinates representing a position on the coordinate surface Q specified by the specified direction of the controller 5, more specifically, a position of the intersection between the coordinate surface Q and the extension of the specified direction (see FIG. 8). The method for calculating the pointing coordinates will now be described with reference to FIG. 17.

Figure 17:
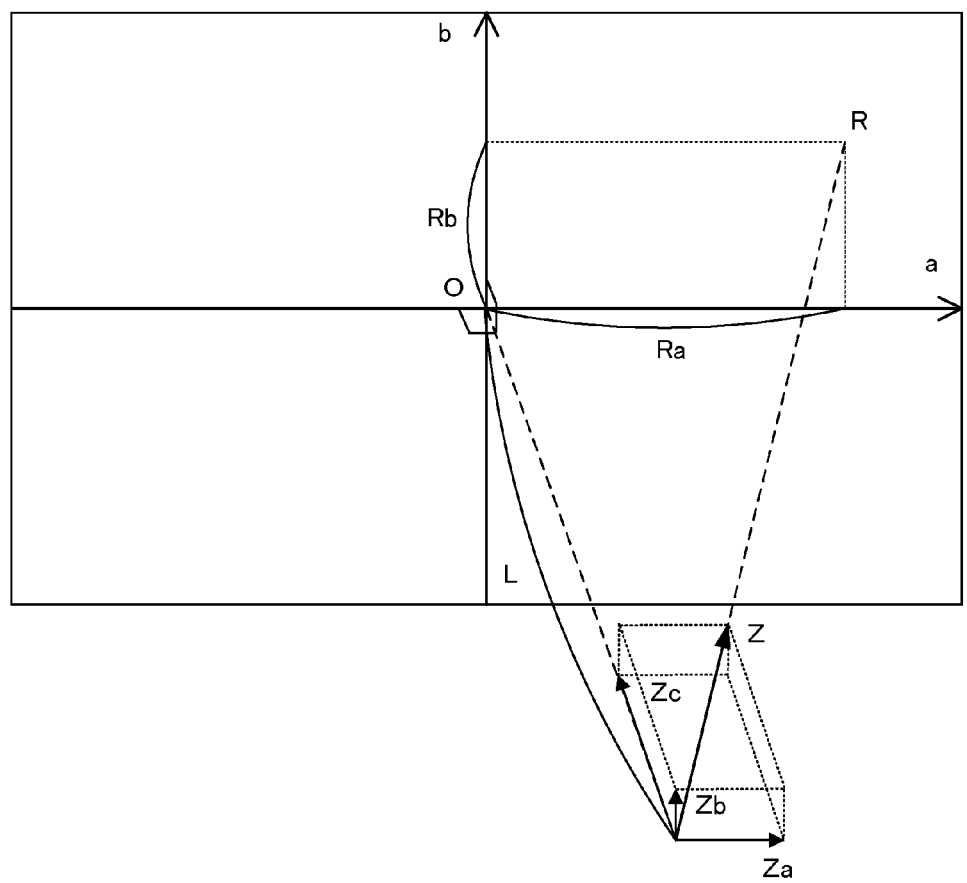
FIG. 17 is a diagram showing an example relationship between the vector Z, which represents the specified direction of the controller, and the pointing position R on the coordinate surface Q.

FIG. 17 is a diagram showing the relationship between the vector Z representing the specified direction of the controller 5 and the pointing position R on the coordinate surface Q. In FIG. 17, the vector Za is a component of the vector Z for the a-axis direction, the vector Zb a component of the vector Z for the b-axis direction, and the vector Zc a component of the vector Z for a direction perpendicular to the coordinate surface Q. As is clear from FIG. 17, the ratio between the coordinate value Ra of the a-axis component of the position R and the magnitude of the vector Za is equal to the ratio between the distance L from the controller 5 to the coordinate surface Q and the magnitude of the vector Zc. Therefore, the coordinate value Ra can be calculated by Expression (6) below.

$$Ra = L \times |Za|/|Zc| \qquad (6)$$

Also with the b-axis component, as with the a-axis component, the ratio between the coordinate value Rb of the b-axis component of the position R and the magnitude of the vector Zb is equal to the ratio between the distance L from the controller 5 to the coordinate surface Q and the magnitude of the vector Zc. Therefore, the coordinate value Rb can be calculated by Expression (7) below.

$$Rb = L \times |Zb|/|Zc| \qquad (7)$$

In Expressions (6) and (7) above, the magnitude |Za| of the vector Za can be calculated as the inner product between the vector Z and the rightward direction vector W. The magnitude |Zb| of the vector Zb can be calculated as the inner product between the vector Z and the upward direction vector U. The magnitude |Zc| of the vector Zc can be calculated as the inner product between the vector Z and the depth direction vector V. Therefore, the pointing coordinates (Ra, Rb) can be calculated based on the attitude of the coordinate surface Q (the three vectors U, V and W), the specified direction (the vector Z) and the distance L.

The method for calculating the pointing coordinates may be any method. For example, where the coordinates representing the position of the intersection R are calculated as the pointing coordinates, the CPU 10 may calculate coordinates of the origin O in a spatial coordinate system and coordinates of the intersection R in the spatial coordinate system to calculate the coordinates of the intersection R in the planar coordinate system based on the positional relationship between these two sets of coordinates. Coordinates representing another position different from the coordinates representing the position of the intersection R may be calculated as the pointing coordinates. For example, based on the specified direction at the time of the setting operation, the CPU 10 may calculate, as the pointing coordinates, coordinates representing a position obtained by moving the origin O by an amount in accordance with the amount of change of the specified direction and in a direction in accordance with the direction of change of the specified direction.

As a specific process of step S6, the CPU 10 reads out the attitude data 57 and the coordinate surface data 59 from the main memory, and calculates the pointing coordinates by Expressions (6) and (7) above. Then, data representing the calculated pointing coordinates is stored in the main memory as the pointing coordinate data 63. The process of step S7 is performed, following step S6.

In step S7, the CPU 10 performs an information process (game process) using the pointing coordinates. The information process may be any process as long as it is a process using the pointing coordinates as an input. In the present embodiment, the CPU 10 reads out the pointing coordinate data 63 from the main memory and performs an information process using the pointing coordinates so as to generate and output an image (game image) representing the results of the information process to a display device (the television 2). For example, the CPU 10 may generate a game image in which the cursor used for performing game operations is arranged at a position in accordance with the pointing coordinates, and display the game image on the television 2. The CPU 10 may cause an object appearing in the game space to act in accordance with the pointing coordinates, and generate an image of the game space including the object therein to display the generated image on the television 2. The process of step S8 is performed, following step S7.

In step S8, the CPU 10 determines whether the game should be ended. The determination of step S8 is made based on, for example, whether the player has given an instruction to quit the game, etc. If the determination result of step S8 is negative, the process of step S2 is performed again. If the determination result of step S8 is affirmative, the CPU 10 ends the game process shown in FIG. 12. When the game process is ended, processes such as saving game data in a memory card, etc., may be performed. Thereafter, the series of processes of steps S2 to S8 is repeatedly performed until it is determined in step S8 that the game should be ended.

As described above, in the present embodiment, when the setting operation is performed (Yes in step S4), the planar coordinate system is set in front of the controller 5 in the specified direction (step S5), and the pointing coordinates are calculated using the set planar coordinate system (step S6). Therefore, by performing the setting operation with the controller 5 directed in a desired direction, the user can perform pointing operations, wherein the direction of the controller 5 at the time of the setting operation is used as the reference (the front direction). Then, in the present embodiment, the direction of the coordinate axis of the planar coordinate system is appropriately set in accordance with the specified direction, and therefore the game system 1 can set a coordinate system with which pointing operations are easy to perform, irrespective of the direction of the controller 5 when the user performs the setting operation. With the present embodiment, the user can easily perform pointing operations, aiming in any direction. For example, the user can perform pointing operations with no awkwardness even when performing pointing operations aiming in the upward direction while lying down on the floor or when performing pointing operations aiming down toward the floor.

[6. Variations]

The embodiment above is merely an example, and the information processing system, etc., may be implemented with a configuration to be described below, for example, in other embodiments.

Figure 18:
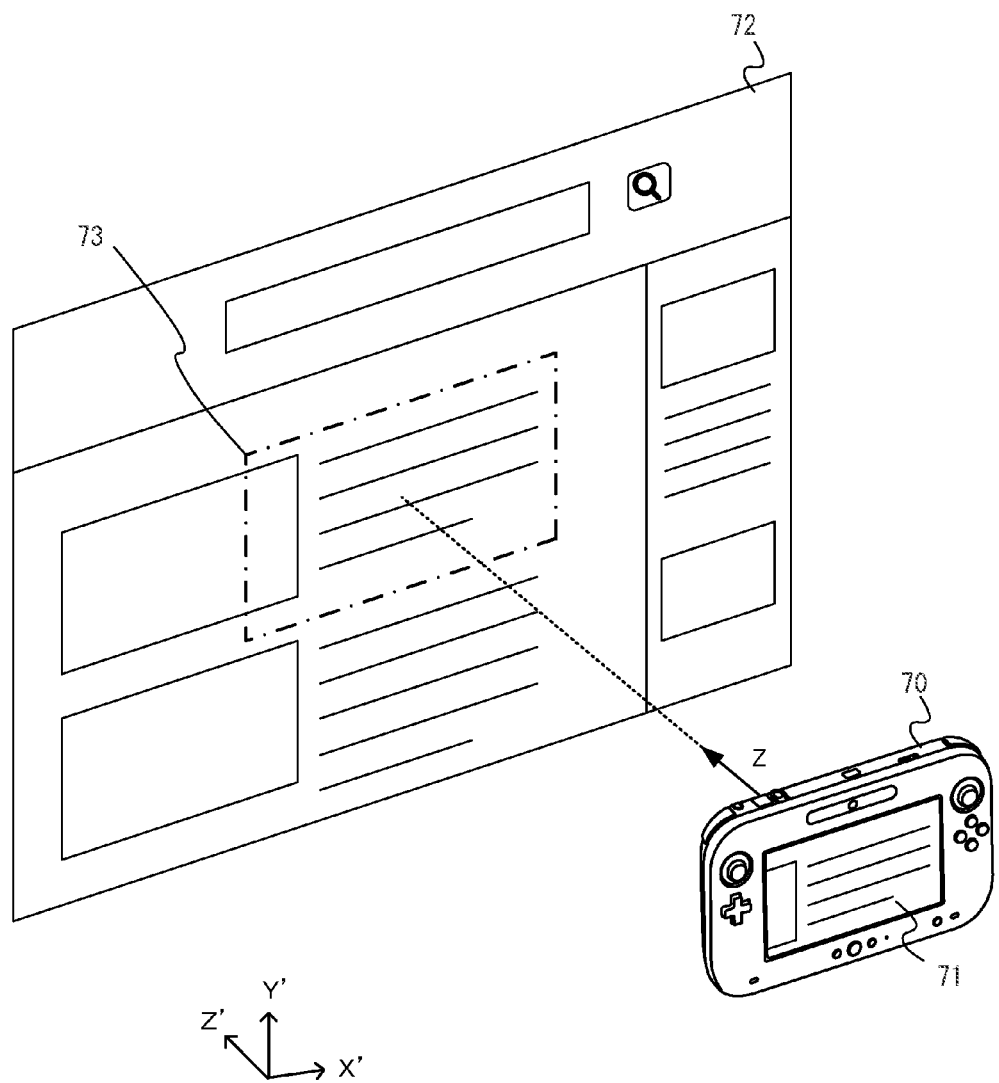
FIG. 18 is a diagram showing a variation of the embodiment above.

FIG. 18 is a diagram showing a variation of the embodiment above. The embodiment above is directed to a system using the controller 5 as an example controller device. The controller device may be any device that can be moved and controlled by the user. In this variation, a portable terminal device 70 having a display device is used as the controller device instead of the controller 5. The game system 1 includes the terminal device 70 instead of the controller 5 (or together with the controller 5). Note that the terminal device 70 may be a portable game device that is capable of performing game processes by executing a game program.

First, a configuration of the terminal device 70 will be described. As shown in FIG. 18, the terminal device 70 has a plate-like shape. Therefore, the user can control the terminal device 70 while holding one or both of the left and right sides of the plate-like terminal device 70.

The terminal device 70 includes a communication unit capable of communicating with the game device 3. Data exchanged with the game device 3 may be any data. In this variation, the communication unit transmits, to the game device 3, operation data representing operations performed on the terminal device 70 by the user. The communication unit receives image data generated by the game device 3 from the game device 3.

The terminal device 70 includes a sensor unit for detecting physical quantities for calculating the attitude of the terminal device 70 itself. In this variation, the terminal device 70 includes, as the sensor unit, a gyrosensor and/or an acceleration sensor similar to those of the controller 5. In other embodiments, the sensor unit may be a sensor unit capable of detecting the physical quantity, and may include a magnetic sensor, for example. In other embodiments, the game system 1 may include a camera for capturing an image of the terminal device 70, and the game device 3 may obtain the image-capturing result of the camera to calculate the attitude of the terminal device 70 using the image-capturing result.

The terminal device 70 includes a display unit such as an LCD. The terminal device 70 receives data of an image generated by the game device 3, and displays the image on a display unit. In other embodiments, the terminal device 70 may be capable of generating images based on data received from the game device 3.

The terminal device 70 includes an operation unit for performing operations other than the operation of moving the terminal device 70. While the operation unit may be any operation unit, the terminal device 70 in this variation includes one or more buttons, a stick with which direction inputs can be made, and a touch panel provided on the screen of the display unit, as operation units.

Next, an object to be set in the virtual space (setting object) will be described. While the setting object is a coordinate system (the coordinate surface Q) in the embodiment above, the setting object may be any object. In this variation, the setting object is an image (an object representing an image) 72 as shown in FIG. 18. While the image 72 may be of any contents, it may be an image of a web page, for example. That is, the game system (information processing system) 1 in this variation is a system for viewing web pages using the terminal device 70. An image of a partial area (an area 73 in FIG. 18) of a web page is displayed on a screen 71 of the display unit of the terminal device 70. The user can move the area 73 across the image 72 by moving (changing the attitude of) the terminal device 70 so as to view a desired portion of the web page, the details of which will be described later. In other embodiments, the object to be set in the virtual space is not limited to those having a two-dimensional shape, but may be those having a three-dimensional shape.

In this variation, the process of arranging (setting) the image 72 in the virtual space is similar to the process of setting the coordinate surface Q in the embodiment above. That is, the game device 3 calculates the attitude of the terminal device 70 in the virtual space. The method for calculating the attitude of the terminal device 70 in this variation may be any method, and it may be, for example, the same as the method for calculating the attitude of the controller 5 in the embodiment above.

In this variation, when the setting operation (herein a predetermined operation on the terminal device 70) is performed by the user, the image 72 is set in the virtual space through processes of steps S11 to S15 similar to those of the embodiment above. That is, the game device 3 sets the direction of the setting object with respect to the vertical direction (Y'-axis direction) in the virtual space when the specified direction, which is determined by the attitude of the terminal device 70 at the time of the setting operation, is closer to the horizontal direction in the virtual space than a predetermined reference. That is, the image 72 is arranged so that the upward direction thereof is the vertical direction in the virtual space when the specified direction is close to the horizontal direction. In this variation, the specified direction (the vector Z) of the terminal device 70 is determined as a direction perpendicular to the surface of the plate-like shape of the terminal device 70 (more specifically, a direction extending from the front side toward the rear side of the screen 71). On the other hand, the game device 3 sets the direction of the setting object with respect to the predetermined direction of the terminal device 70 when the specified direction is closer to the vertical direction than the predetermined reference. In this variation, the upward direction of the terminal device 70 is the upward direction of the screen 71 of the display unit. That is, the image 72 is arranged so that the upward direction thereof is the upward direction of the terminal device 70 when the when the specified direction is close to the vertical direction. Therefore, in this variation, the image 72 is arranged in an appropriate direction both when the specified direction is close to the horizontal direction and when the specified direction is close to the vertical direction. Thus, the image 72 is displayed on the terminal device 70 in such a manner that it is easily viewed by the user, and the controllability of the operation of moving the area 73 to be described below is improved.

In this variation, the game device 3 sets a virtual camera in the virtual space, and displays, on the terminal device 70, the image of a portion of the image 72 as viewed from the virtual camera. The virtual camera is set so that the viewing range (the area 73 of the image 72) changes in accordance with the attitude of the terminal device 70. Specifically, the game device 3 arranges the virtual camera at the position of the terminal device 70, and controls the attitude of the virtual camera so that the viewing direction is the specified direction of the terminal device 70. Thus, the viewing range of the virtual camera is the area 73 of the image 72, and the user can move the area 73 across the image 72 by an operation of changing the attitude of the terminal device 70. Thus, in this variation, such pointing operations as those of the embodiment above are not performed. The setting method for a setting object in the embodiment above is not limited to a coordinate system used for calculating the pointing coordinates, but is applicable to any process of setting any object.

While an information processing system for setting a predetermined setting object in a virtual space based on the attitude of the controller device is applied to a game system in the embodiment above, the information processing system is applicable to applications other than games.

While the above variation is directed to an information processing system including the game device 3 and the terminal device 70, processes performed by the game device 3 may be performed by the terminal device 70. That is, the information processing system is not limited to a configuration including a plurality of devices capable of communicating with one another, but may be implemented as an integral device. In other embodiments, in an information processing system that includes a plurality of information processing devices capable of communicating with one another, information processes may be divided among the plurality of information processing devices.

As described above, the present embodiment is applicable to a pointing system for performing pointing operations, a game system, etc., with the aim of, for example, setting a predetermined object in an appropriate direction in accordance with a specified direction of a controller device.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A pointing system for performing a pointing operation based on an attitude of a controller device, the pointing system comprising:
   a computer processing system, including at least one processor, the computer processing system being configured to:
      calculate the attitude of the controller device in a predetermined space;
      set a predetermined coordinate system in the predetermined space; and
      calculate pointing coordinates in the coordinate system based on a relationship of the attitude with respect to the coordinate system, wherein:
      the pointing coordinates are calculated based on a specified direction determined by the attitude of the controller device; and
      a direction of a predetermined axis of the coordinate system is set with respect to a vertical direction in the predetermined space when the specified direction is closer to a horizontal direction than a predetermined reference, and the direction of the predetermined axis of the coordinate system is set with respect to a predetermined direction of the controller device in the predetermined space when the specified direction is closer to the vertical direction than the predetermined reference.

2. The pointing system according to claim 1, wherein the computer processing system is configured to calculate pointing coordinates representing a position specified by the specified direction on a surface defined by the coordinate system.

3. The pointing system according to claim 1, wherein:
   the controller device has an elongated shape; and
   the specified direction is determined as a longitudinal direction of the controller device.

4. The pointing system according to claim 1, wherein:
   the controller device has a plate-like shape; and
   the specified direction is determined as a direction perpendicular to a surface of the plate-like shape of the controller device.

5. The pointing system according to claim 1, wherein the computer processing system sets the coordinate system so that a downward direction in the coordinate system extends in a direction of gravity in the predetermined space, or sets the coordinate system so that the downward direction in the coordinate system extends in a downward direction of the controller device.

6. The pointing system according to claim 1, wherein:
   the controller device comprises a sensor unit including a gyrosensor and/or an acceleration sensor; and
   the attitude of the controller device is calculated based on a detection result of the sensor unit.

7. A pointing system for performing a pointing operation based on an attitude of a controller device, the pointing system comprising:
   a computer processing system, including at least one processor, the computer processing system being configured to:
      calculate the attitude of the controller device in a predetermined space;
      set a predetermined coordinate system in the predetermined space; and
      calculate pointing coordinates in the coordinate system based on a relationship of the attitude with respect to the coordinate system, wherein:
      the computer processing system sets a direction of a predetermined axis of the coordinate system with respect to a vertical direction in the predetermined space, or sets the direction of the predetermined axis of the coordinate system with respect to a direction of the controller device in the predetermined space; and
      the coordinate system is set so that the predetermined axis of the coordinate system is closer to the vertical direction when a specified direction determined by the attitude of the controller device is closer to a horizontal direction, and is set so that the predetermined axis is closer to a predetermined direction of the controller device when the specified direction is closer to the vertical direction.

8. The pointing system according to claim 7, wherein the computer processing system sets the coordinate system so that a downward direction in the coordinate system extends in a direction of gravity in the predetermined space, or sets the coordinate system so that the downward direction in the coordinate system extends in a downward direction of the controller device.

9. The pointing system according to claim 7, wherein:
   the controller device comprises a sensor unit including a gyrosensor and/or an acceleration sensor; and
   the attitude of the controller device is calculated based on a detection result of the sensor unit.

10. An information processing system for setting a predetermined setting object in a virtual space based on an attitude of a controller device, the information processing system comprising:
    a computer processing system, including at least one processor, the computer processing system being configured to:
       calculating the attitude of the controller device in the virtual space; and
       setting a direction of the setting object with respect to a vertical direction in the virtual space when a specified direction, which is determined by the attitude of the controller device, is closer to a horizontal direction in the virtual space than a predetermined reference, and setting the direction of the setting object with respect to a predetermined direction of the controller device when the specified direction is closer to the vertical direction than the predetermined reference.

11. A computer-implemented coordinate system setting method to be carried out in a pointing system for performing a pointing operation based on an attitude of a controller device, the coordinate system setting method comprising:
    calculating, by a computer, the attitude of the controller device in a predetermined space;

setting, by the computer, a predetermined coordinate system in the predetermined space; and calculating, by the computer, pointing coordinates in the coordinate system based on a relationship of the attitude with respect to the coordinate system, wherein:

the pointing coordinates are calculated based on a specified direction, which is determined by the attitude of the controller device; and a direction of a predetermined axis of the coordinate system is set with respect to a vertical direction in the predetermined space when the specified direction is closer to a horizontal direction than a predetermined reference, and the direction of the predetermined axis of the coordinate system is set with respect to a predetermined direction of the controller device in the predetermined space when the specified direction is closer to the vertical direction than the predetermined reference.

12. The coordinate system setting method according to claim 11, wherein pointing coordinates representing a position specified by the specified direction on a surface defined by the coordinate system.

13. The coordinate system setting method according to claim 11, wherein:
the controller device has an elongated shape; and
the specified direction is determined as a longitudinal direction of the controller device.

14. The coordinate system setting method according to claim 11, wherein:
the controller device has a plate-like shape; and
the specified direction is determined as a direction perpendicular to a surface of the plate-like shape of the controller device.

15. The coordinate system setting method according to claim 11, wherein the coordinate system is set so that a downward direction in the coordinate system extends in a direction of gravity in the predetermined space, or is set so that the downward direction in the coordinate system extends in a downward direction of the controller device.

16. The coordinate system setting method according to claim 11, wherein:
the controller device comprises a sensor unit including a gyrosensor and/or an acceleration sensor; and
the attitude of the controller device is calculated based on a detection result of the sensor unit.

17. A computer-implemented coordinate system setting method to be carried out in a pointing system for performing a pointing operation based on an attitude of a controller device, the coordinate system setting method comprising:
calculating, by a computer, the attitude of the controller device in a predetermined space;
setting, by the computer, a predetermined coordinate system in the predetermined space; and
calculating, by the computer, pointing coordinates in the coordinate system based on a relationship of the attitude with respect to the coordinate system, wherein:
a direction of a predetermined axis of the coordinate system is set with respect to a vertical direction in the predetermined space or is set with respect to a direction of the controller device in the predetermined space; and
the coordinate system is set so that the predetermined axis of the coordinate system is closer to the vertical direction when a specified direction determined by the attitude of the controller device is closer to a horizontal direction, and so that the predetermined axis is closer to a predetermined direction of the controller device when the specified direction is closer to the vertical direction.

18. The coordinate system setting method according to claim 17, wherein the coordinate system is set so that a downward direction in the coordinate system extends in a direction of gravity in the predetermined space, or is set so that the downward direction in the coordinate system extends in a downward direction of the controller device.

19. The coordinate system setting method according to claim 17, wherein:
the controller device comprises a sensor unit including a gyrosensor and/or an acceleration sensor; and
the attitude of the controller device is calculated based on a detection result of the sensor unit.

20. An computer-implemented object setting method to be carried out in an information processing system for setting a predetermined setting object in a virtual space based on an attitude of a controller device, the object setting method comprising:
calculating, by a computer, the attitude of the controller device in the virtual space; and
setting, by the computer, a direction of the setting object with respect to a vertical direction in the virtual space when a specified direction, which is determined by the attitude of the controller device, is closer to a horizontal direction in the virtual space than a predetermined reference, and setting the direction of the setting object with respect to a predetermined direction of the controller device when the specified direction is closer to the vertical direction than the predetermined reference.

21. An information processing device for calculating pointing coordinates based on an attitude of a controller device, the information processing device comprising at least one processor being configured to:
calculate the attitude of the controller device in a predetermined space;
set a predetermined coordinate system in the predetermined space; and
calculate pointing coordinates in the coordinate system based on a relationship of the attitude with respect to the coordinate system, wherein:
the pointing coordinates are calculated based on a specified direction determined by the attitude of the controller device; and
a direction of a predetermined axis of the coordinate system is set with respect to a vertical direction in the predetermined space when the specified direction is closer to a horizontal direction than a predetermined reference, and the direction of the predetermined axis of the coordinate system is set with respect to a predetermined direction of the controller device in the predetermined space when the specified direction is closer to the vertical direction than the predetermined reference.

22. An information processing device for setting a predetermined setting object in a virtual space based on an attitude of a controller device, the information processing device comprising at least one processor being configured to:
calculate the attitude of the controller device in the virtual space; and
set a direction of the setting object with respect to a vertical direction in the virtual space when a specified direction, which is determined by the attitude of the controller device, is closer to a horizontal direction in the virtual space than a predetermined reference, and setting the direction of the setting object with respect to a predetermined direction of the controller device when the specified direction is closer to the vertical direction than the predetermined reference.

23. A non-transitory computer-readable storage medium storing an information processing program to be executed by a computer provided in a pointing system for performing a pointing operation based on an attitude of a controller device, the information processing program causing the computer to execute:
   calculating the attitude of the controller device in a predetermined space;
   setting a predetermined coordinate system in the predetermined space; and
   calculating pointing coordinates in the coordinate system based on a relationship of the attitude with respect to the coordinate system, wherein:
   the pointing coordinates are calculated based on a specified direction, which is determined by the attitude of the controller device; and
   a direction of a predetermined axis of the coordinate system is set with respect to a vertical direction in the predetermined space when the specified direction is closer to a horizontal direction than a predetermined reference, and the direction of the predetermined axis of the coordinate system is set with respect to a predetermined direction of the controller device in the predetermined space when the specified direction is closer to the vertical direction than the predetermined reference.

24. The storage medium according to claim 23, wherein the coordinate system is set so that a downward direction in the coordinate system extends in a direction of gravity in the predetermined space, or the coordinate system is set so that the downward direction in the coordinate system extends in a downward direction of the controller device.

25. A non-transitory computer-readable storage medium storing an information processing program to be executed by a computer provided in a pointing system for performing a pointing operation based on an attitude of a controller device, the information processing program causing the computer to execute:
   calculating the attitude of the controller device in a predetermined space;
   setting a predetermined coordinate system in the predetermined space; and
   calculating pointing coordinates in the coordinate system based on a relationship of the attitude with respect to the coordinate system, wherein:
   a direction of a predetermined axis of the coordinate system is set with respect to a vertical direction in the predetermined space, or is set with respect to a direction of the controller device in the predetermined space; and
   the coordinate system is set so that the predetermined axis of the coordinate system is closer to the vertical direction when a specified direction determined by the attitude of the controller device is closer to a horizontal direction, and so that the predetermined axis is closer to a predetermined direction of the controller device when the specified direction is closer to the vertical direction.

26. The storage medium according to claim 25, wherein the coordinate system is set so that a downward direction in the coordinate system extends in a direction of gravity in the predetermined space, or the coordinate system is set so that the downward direction in the coordinate system extends in a downward direction of the controller device.

27. A non-transitory computer-readable storage medium storing an information processing program to be executed by a computer of an information processing system for setting a predetermined setting object in a virtual space based on an attitude of a controller device, the information processing program causing the computer to execute:
   calculating the attitude of the controller device in the virtual space; and
   setting a direction of the setting object with respect to a vertical direction in the virtual space when a specified direction, which is determined by the attitude of the controller device, is closer to a horizontal direction in the virtual space than a predetermined reference, and setting the direction of the setting object with respect to a predetermined direction of the controller device when the specified direction is closer to the vertical direction than the predetermined reference.

28. An information processing device for calculating pointing coordinates based on an attitude of a controller device, the information processing device comprising at least one processor being configured to:
   calculate the attitude of the controller device in a predetermined space;
   set a predetermined coordinate system in the predetermined space; and
   calculate pointing coordinates in the coordinate system based on a relationship of the attitude with respect to the coordinate system, wherein:
   the computer processing system sets a direction of a predetermined axis of the coordinate system with respect to a vertical direction in the predetermined space, or sets the direction of the predetermined axis of the coordinate system with respect to a direction of the controller device in the predetermined space; and
   the coordinate system is set so that the predetermined axis of the coordinate system is closer to the vertical direction when a specified direction determined by the attitude of the controller device is closer to a horizontal direction, and is set so that the predetermined axis is closer to a predetermined direction of the controller device when the specified direction is closer to the vertical direction.

* * * * *